(12) United States Patent
Kusafuka et al.

(10) Patent No.: US 10,923,003 B2
(45) Date of Patent: Feb. 16, 2021

(54) LIGHT SOURCE APPARATUS, DISPLAY APPARATUS, VEHICLE, THREE-DIMENSIONAL PROJECTION APPARATUS, THREE-DIMENSIONAL PROJECTION SYSTEM, IMAGE PROJECTION APPARATUS, AND IMAGE DISPLAY APPARATUS

(71) Applicant: KYOCERA Corporation, Kyoto (JP)

(72) Inventors: Kaoru Kusafuka, Tokyo (JP); Yusuke Hayashi, Fort Lee, NJ (US); Satoshi Kawaji, Yokohama (JP); Shin Miura, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/467,884

(22) PCT Filed: Dec. 1, 2017

(86) PCT No.: PCT/JP2017/043368
§ 371 (c)(1),
(2) Date: Jun. 7, 2019

(87) PCT Pub. No.: WO2018/105534
PCT Pub. Date: Jun. 14, 2018

(65) Prior Publication Data
US 2020/0074896 A1    Mar. 5, 2020

(30) Foreign Application Priority Data

Dec. 7, 2016 (JP) .............................. JP2016-237398
Dec. 7, 2016 (JP) .............................. JP2016-237825
(Continued)

(51) Int. Cl.
*G06T 7/70* (2017.01)
*G09G 3/00* (2006.01)
*G02B 27/01* (2006.01)

(52) U.S. Cl.
CPC ......... *G09G 3/001* (2013.01); *G02B 27/0101* (2013.01); *G06T 7/70* (2017.01);
(Continued)

(58) Field of Classification Search
CPC ..................................................... G09G 3/001
See application file for complete search history.

(56) References Cited

U.S. PATENT DOCUMENTS 9,892,643 B2    2/2018 Aoki
10,242,608 B2    3/2019 Tanaka et al.
(Continued)

FOREIGN PATENT DOCUMENTS

EP    2 418 868 A2    2/2012
JP    2009-269551 A    11/2009
(Continued)

OTHER PUBLICATIONS

Nippon Seiki Co., Ltd., "2-Plane Head-up Display," [online], Apr. 23, 2015, Nippon Seiki Co., Ltd. [retrieved Oct. 17, 2016], Internet <URL: http://www.nippon-seiki.co.jp/wp-content/uploads/2-Plane-HUD#20150508.pdf>.

*Primary Examiner* — Jitesh Patel
(74) *Attorney, Agent, or Firm* — Studebaker & Brackett PC

(57) ABSTRACT

An image projection apparatus includes a display configured to display an image, a first optical member, at least one second optical member configured to project the image onto the first optical member and make a virtual image of the
(Continued)

image visible to a subject, and a controller configured to dynamically correct the image in accordance with a position of both eyes of the subject.

14 Claims, 18 Drawing Sheets

(30) Foreign Application Priority Data

| Dec. 7, 2016 | (JP) | JP2016-237832 |
|---|---|---|
| Dec. 7, 2016 | (JP) | JP2016-237877 |
| Jul. 5, 2017 | (JP) | JP2017-132220 |

(52) U.S. Cl.
CPC .......... *G02B 2027/011* (2013.01); *G02B 2027/0134* (2013.01); *G06T 2207/30196* (2013.01); *G09G 2354/00* (2013.01); *G09G 2380/10* (2013.01)

(56) References Cited

U.S. PATENT DOCUMENTS

| 2002/0109701 | A1 | 8/2002 | Deering | |
|---|---|---|---|---|
| 2004/0208358 | A1 | 10/2004 | Tooyama et al. | |
| 2004/0223219 | A1* | 11/2004 | Tooyama | G02B 30/23 359/464 |
| 2005/0036673 | A1* | 2/2005 | Ohba | G01C 11/06 382/154 |
| 2005/0052617 | A1* | 3/2005 | Fujikawa | H04N 13/305 353/10 |
| 2005/0117215 | A1* | 6/2005 | Lange | G06T 15/04 359/462 |
| 2007/0268316 | A1* | 11/2007 | Kajita | G02B 27/017 345/642 |
| 2008/0094391 | A1* | 4/2008 | Yanagihara | G06T 15/10 345/419 |
| 2008/0192312 | A1* | 8/2008 | Hendricks | G03H 1/0808 359/13 |
| 2010/0123774 | A1* | 5/2010 | Tomita | H04N 13/327 348/54 |
| 2014/0362446 | A1* | 12/2014 | Bickerstaff | G02B 27/017 359/630 |
| 2015/0365655 | A1 | 12/2015 | Oka et al. | |
| 2016/0379498 | A1 | 12/2016 | Aoki | |
| 2017/0054963 | A1 | 2/2017 | Kasazumi et al. | |
| 2017/0154554 | A1 | 6/2017 | Tanaka et al. | |
| 2017/0168309 | A1 | 6/2017 | Kasazumi et al. | |

FOREIGN PATENT DOCUMENTS

| JP | 2014-199385 A | 10/2014 |
|---|---|---|
| JP | 2015-168382 A | 9/2015 |
| JP | 2015-197707 A | 11/2015 |
| WO | 2015/174049 A1 | 11/2015 |

* cited by examiner

| No. | Xw | Yw | Zw | Correction information |
|---|---|---|---|---|
| 1 | *** | *** | *** | P1 |
| 2 | *** | *** | *** | P2 |
| ⋮ | ⋮ | ⋮ | ⋮ | ⋮ |
| n | *** | *** | *** | Pn |
FIG. 9
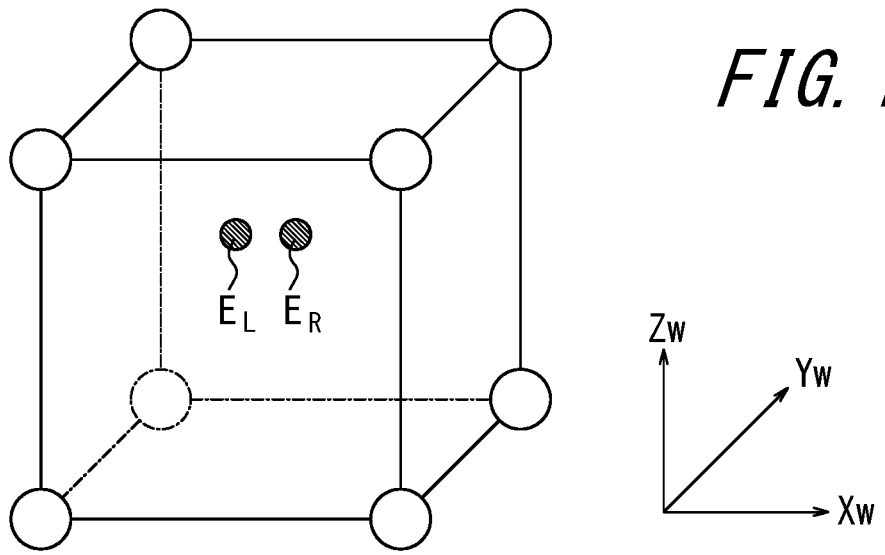
FIG. 10
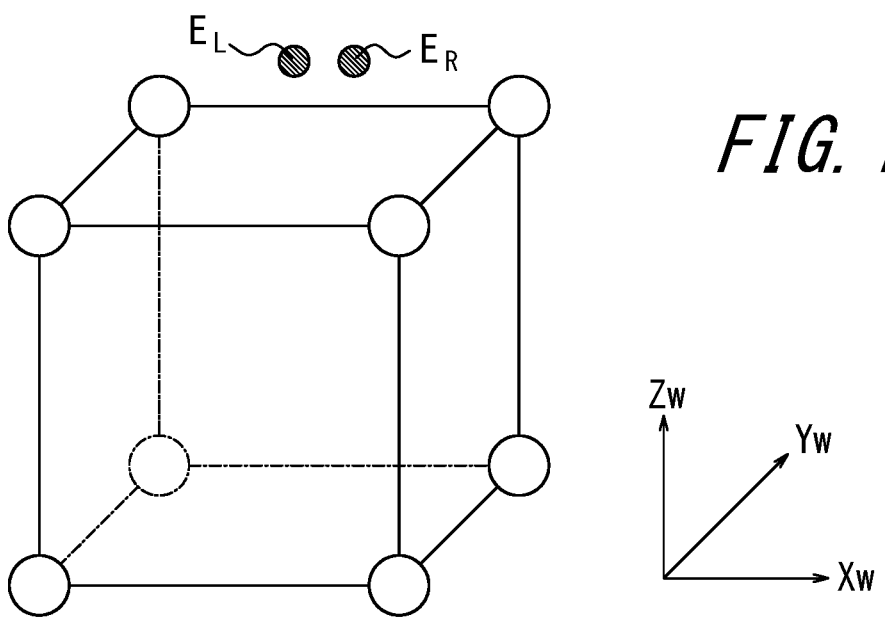
FIG. 11

| No. | Xw | Yw | Zw | Correction information |
|---|---|---|---|---|
| 1 | *** | *** | *** | P1 |
| 2 | *** | *** | *** | P2 |
| ⋮ | ⋮ | ⋮ | ⋮ | ⋮ |
| n | *** | *** | *** | Pn |
FIG. 17
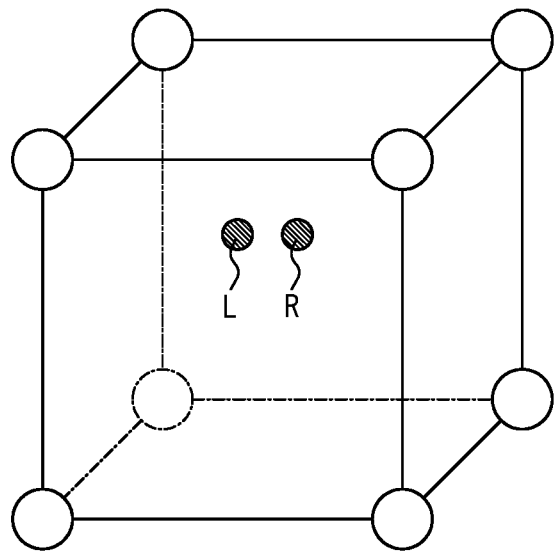
FIG. 18
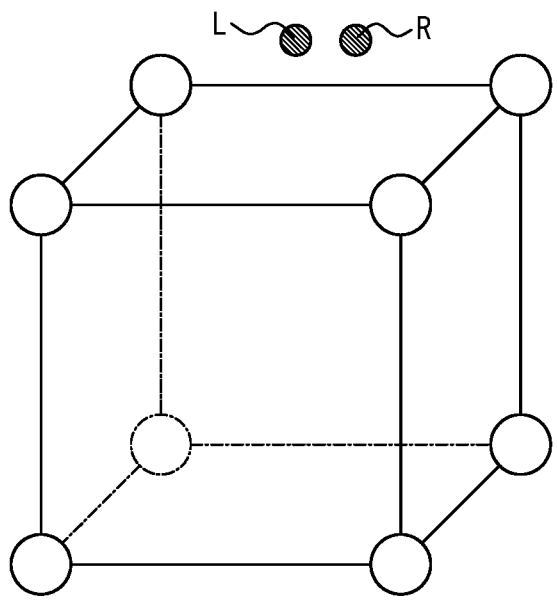
FIG. 19

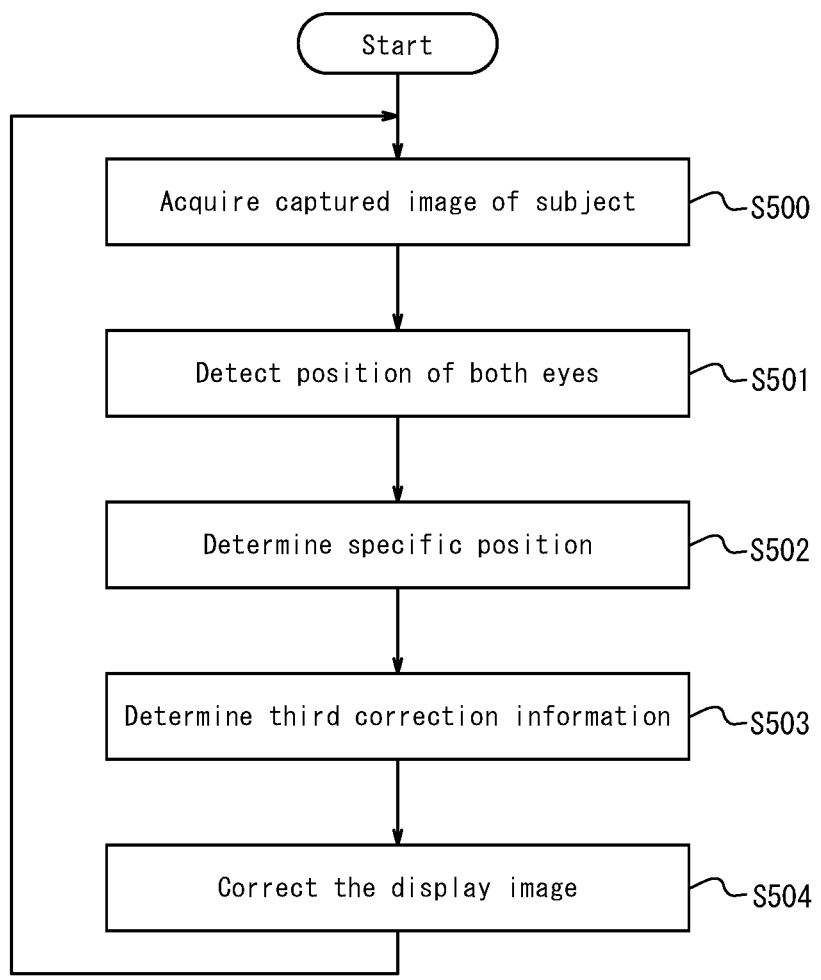

LIGHT SOURCE APPARATUS, DISPLAY APPARATUS, VEHICLE, THREE-DIMENSIONAL PROJECTION APPARATUS, THREE-DIMENSIONAL PROJECTION SYSTEM, IMAGE PROJECTION APPARATUS, AND IMAGE DISPLAY APPARATUS

CROSS-REFERENCE TO RELATED APPLICATION

The present application claims priority to and the benefit of Japanese Patent Application No. 2016-237398, No. 2016-237825, No. 2016-237832, and No. 2016-237877 filed Dec. 7, 2016 and Japanese Patent Application No. 2017-132220 filed Jul. 5, 2017, the entire contents of which are incorporated herein by reference.

TECHNICAL FIELD

The present disclosure relates to a light source apparatus, a display apparatus, a vehicle, a three-dimensional projection apparatus, a three-dimensional projection system, an image projection apparatus, and an image display apparatus.

BACKGROUND

A known display apparatus is mounted in a vehicle, such as a wheeled vehicle, and causes a user, such as the driver of the vehicle, to see a plurality of display images with different appearances as virtual images. Techniques for making a virtual image visible to a subject, such as the driver of a vehicle, are also known.

SUMMARY

A light source apparatus according to an embodiment of the present disclosure is for emitting light to be transmitted through a transmission-type display panel. The light source apparatus includes at least one first light-emitting element and at least one second light-emitting element. The at least one first light-emitting element is configured to emit first light towards a first area of the transmission-type display panel. The at least one second light-emitting element is configured to emit second light towards a second area of the transmission-type display panel, the second light having a maximum luminance smaller than a maximum luminance of the first light.

A display apparatus according to an embodiment of the present disclosure includes a transmission-type display panel and a light source apparatus. The transmission-type display panel includes a first area, a second area, and a third area. The third area is positioned between the first area and the second area. The light source apparatus includes a first light-emitting element and a second light-emitting element. The first light-emitting element is configured to emit first light towards the first area, the first light being blocked from the third area. The second light-emitting element is configured to emit second light towards the second area, the second light having a maximum luminance smaller than a maximum luminance of the first light and being blocked from the third area.

A display apparatus according to an embodiment of the present disclosure includes a transmission-type display panel, a light source apparatus, a first projection optical system, and a second projection optical system. The transmission-type display panel includes a first area and a second area. The light source apparatus includes at least one first light-emitting element and at least one second light-emitting element. The at least one first light-emitting element is configured to emit first light towards the first area. The at least one second light-emitting element is configured to emit second light towards the second area, the second light having a maximum luminance smaller than a maximum luminance of the first light. The first projection optical system is configured to project third light transmitted through the first area. The second projection optical system is configured to project fourth light transmitted through the second area. The optical path length of the third light from the transmission-type display panel to the first projection optical system is shorter than the optical path length of the fourth light from the transmission-type display panel to the second projection optical system.

A vehicle according to an embodiment of the present disclosure includes a transmission-type display panel and a light source apparatus. The transmission-type display panel includes a first area and a second area. The light source apparatus includes at least one first light-emitting element and at least one second light-emitting element. The at least one first light-emitting element is configured to emit first light towards the first area. The at least one second light-emitting element is configured to emit second light towards the second area, the second light having a maximum luminance smaller than a maximum luminance of the first light.

A three-dimensional projection apparatus according to an embodiment of the present disclosure includes a display, an optical element, an optical member, and a controller. The display includes a display surface having a plurality of subpixels arranged in a grid along a first direction and a second direction substantially orthogonal to the first direction. The optical element is configured to define a light beam direction of image light emitted from the subpixels for each strip-shaped region among a plurality of strip-shaped regions extending in the second direction on the display surface. The optical member is configured to project the image light, the light beam direction of which is defined by the optical element, so that a virtual image of the display surface is formed. The controller is configured to acquire information related to a position of an eye of a subject and to correct, in accordance with the position of the eye, the optical element and an image to be displayed by the display surface.

A three-dimensional projection system according to an embodiment of the present disclosure includes a detection apparatus and a three-dimensional projection apparatus. The detection apparatus is configured to detect a position of an eye of a subject. The three-dimensional projection apparatus includes a display, an optical element, an optical member, and a controller. The display includes a display surface having a plurality of subpixels arranged in a grid along a first direction and a second direction substantially orthogonal to the first direction. The optical element is configured to define a light beam direction of image light emitted from the subpixels for each strip-shaped region among a plurality of strip-shaped regions extending in the second direction on the display surface. The optical member is configured to project the image light, the light beam direction of which is defined by the optical element, so that a virtual image of the display surface is formed. The controller is configured to acquire information related to the position of the eye from the detection apparatus and to correct, in accordance with the position of the eye, the optical element and an image to be displayed by the display surface.

A vehicle according to an embodiment of the present disclosure includes a three-dimensional projection system. The three-dimensional projection system includes a detection apparatus and a three-dimensional projection apparatus. The detection apparatus is configured to detect a position of an eye of a subject. The three-dimensional projection apparatus includes a display, an optical element, an optical member, and a controller. The display includes a display surface having a plurality of subpixels arranged in a grid along a first direction and a second direction substantially orthogonal to the first direction. The optical element is configured to define a light beam direction of image light emitted from the subpixels for each strip-shaped region among a plurality of strip-shaped regions extending in the second direction on the display surface. The optical member is configured to project the image light, the light beam direction of which is defined by the optical element, so that a virtual image of the display surface is formed. The controller is configured to acquire information related to the position of the eye from the detection apparatus and to correct, in accordance with the position of the eye, the optical element and an image to be displayed by the display surface.

An image projection apparatus according to an embodiment of the present disclosure includes a display, at least one second optical member, and a controller. The display is configured to display an image. The second optical member is configured to project the image onto the first optical member and make a virtual image of the image visible to a subject. The controller is configured to dynamically correct, in accordance with a position of both eyes of the subject, the image to be displayed by the display.

An image display apparatus according to an embodiment of the present disclosure includes a display and a controller. The display is configured to display an image. The controller is configured to dynamically correct, in accordance with a position of both eyes of a subject, the image to be displayed by the display.

A vehicle according to an embodiment of the present disclosure includes a first optical member, a display, at least one second optical member, and a controller. The display is configured to display an image. The second optical member is configured to project the image onto the first optical member and make a virtual image of the image visible to a subject. The controller is configured to dynamically correct, in accordance with a position of both eyes of the subject, the image to be displayed by the display.

An image projection apparatus according to an embodiment of the present disclosure includes a display, at least one second optical member, and a controller. The display is configured to display a plurality of images. The second optical member is configured to project the plurality of images onto a first optical member and make virtual images of the plurality of images visible to a subject. The controller is configured to dynamically correct, in accordance with a position of both eyes of the subject, each image among the plurality of images to be displayed by the display.

An image display apparatus according to an embodiment of the present disclosure includes a display and a controller. The display is configured to display a plurality of images. The controller is configured to dynamically correct, in accordance with a position of both eyes of a subject, each image among the plurality of images to be displayed by the display.

A vehicle according to an embodiment of the present disclosure includes a first optical member, a display, at least one second optical member, and a controller. The display is configured to display a plurality of images. The second optical member is configured to project the plurality of images onto the first optical member and make virtual images of the plurality of images visible to a subject. The controller is configured to dynamically correct, in accordance with a position of both eyes of the subject, each image among the plurality of images to be displayed by the display.

An image projection apparatus according to an embodiment of the present disclosure includes a display, at least one second optical member, and a controller. The display is configured to display an image of a polygon as viewed from a virtual camera, the polygon having a texture projected thereon. The second optical member is configured to project the image onto the first optical member and make a virtual image of the image visible to a subject. The controller is configured to dynamically correct the polygon in accordance with a position of both eyes of the subject.

An image display apparatus according to an embodiment of the present disclosure includes a display and a controller. The display is configured to display an image of a polygon as viewed from a virtual camera, the polygon having a texture projected thereon. The controller is configured to dynamically correct the polygon in accordance with a position of both eyes of a subject.

A vehicle according to an embodiment of the present disclosure includes a first optical member, a display, at least one second optical member, and a controller. The display is configured to display an image of a polygon as viewed from a virtual camera, the polygon having a texture projected thereon. The second optical member is configured to project the image onto the first optical member and make a virtual image of the image visible to a subject. The controller is configured to dynamically correct the polygon in accordance with a position of both eyes of the subject.

BRIEF DESCRIPTION OF THE DRAWINGS

In the accompanying drawings:

FIG. 9 illustrates an example of correction information;

FIG. 10 illustrates an example of reference positions and the position of both eyes of a subject;

FIG. 11 illustrates another example of reference positions and the position of both eyes of a subject;

FIG. 17 illustrates an example of correction information corresponding to each reference position in a vehicle;

FIG. 18 illustrates a first example of reference positions and the position of both eyes of a subject;

FIG. 19 illustrates a second example of reference positions and the position of both eyes of a subject;

FIG. 22 is a flowchart illustrating third operations of an image projection apparatus.

DETAILED DESCRIPTION

Figure 1:
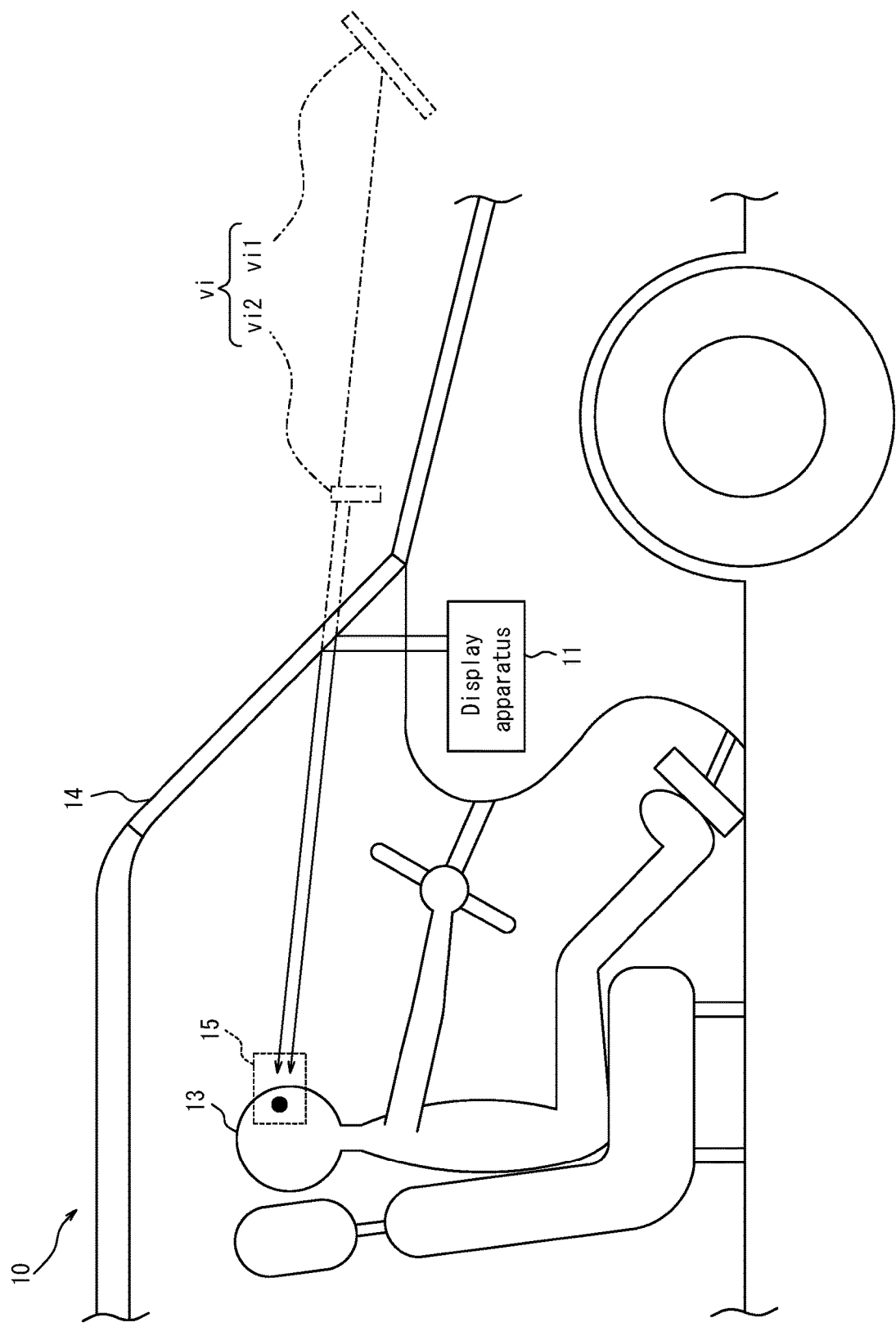
FIG. 1 illustrates a vehicle and a display apparatus according to first embodiments of the present disclosure.

Embodiments of the present disclosure are now described with reference to the drawings.

First Embodiments

First embodiments of the present disclosure are described. Improved convenience is desired for apparatuses that make a virtual image visible to a user. The present embodiments provide a light source apparatus, a display apparatus, and a vehicle with improved convenience. The light source apparatus, display apparatus, and vehicle according to the present embodiments improve convenience. A vehicle 10 and a display apparatus 11 according to the present embodiments are now described with reference to FIG. 1. The vehicle 10 includes the display apparatus 11.

The "vehicle" in the present disclosure may, for example, encompass wheeled vehicles, ships, and aircraft. Wheeled vehicles may, for example, include automobiles, industrial wheeled vehicles, railway wheeled vehicles, wheeled vehicles for daily life, and fixed-wing aircraft that run on a runway. Automobiles may, for example, include passenger wheeled vehicles, trucks, buses, motorcycles, and trolley buses. Industrial wheeled vehicles may, for example, include industrial wheeled vehicles for agriculture and for construction. Industrial wheeled vehicles may, for example, include forklifts and golf carts. Industrial wheeled vehicles for agriculture may, for example, include tractors, cultivators, transplanters, binders, combines, and lawnmowers. Industrial wheeled vehicles for construction may, for example, include bulldozers, scrapers, backhoes, cranes, dump cars, and road rollers. Wheeled vehicles may include man-powered wheeled vehicles. The types of wheeled vehicles are not limited to the above examples. For example, automobiles may include industrial wheeled vehicles that can be driven on the road. The same wheeled vehicle may also be included in multiple categories. Ships may, for example, include marine jets, boats, and tankers. Aircraft may, for example, include fixed-wing aircraft and rotorcraft.

The display apparatus 11 is installed at any position in the vehicle 10. The display apparatus 11 may, for example, be installed in the dashboard of the vehicle 10. The display apparatus 11 functions as a portion of a head-up display system that, for example, makes a virtual image vi of a required image visible to a user 13, such as the driver of the vehicle 10.

The display apparatus 11 of the present embodiments emits projection light, formed as an image, towards a predetermined region of a first optical member 14 provided in the vehicle 10. The projection light, formed as an image, is also referred to as "image projection light". In the present embodiments, the first optical member 14 may be a windshield. In another embodiment, the first optical member 14 may be a combiner.

When the display apparatus 11 includes the first optical member 14, the display apparatus 11 can function as a head-up display. Image projection light, reflected by the first optical member 14, reaches an eye box 15. The eye box 15 is a region in actual space in which it is assumed that the eyes of the user 13 may be located, taking into consideration the physique, posture, change in posture, and the like of the user 13, for example.

The solid arrow in FIG. 1 indicates the path over which a portion of the image projection light, emitted from the display apparatus 11, reaches the eye box 15. The path traveled by light is referred to as the optical path. Along the optical path, an optical element that transmits light and an optical element that reflects light are included. When the eyes of the user 13 are inside the eye box 15 and image projection light reaches the eye box 15, the user 13 can see a virtual image vi of the image. The virtual image vi can be visible in front of the vehicle 10, for example. The display apparatus 11 works together with the first optical member 14 to make the virtual image vi of a required image visible to the user 13 of the vehicle 10.

Figure 2:
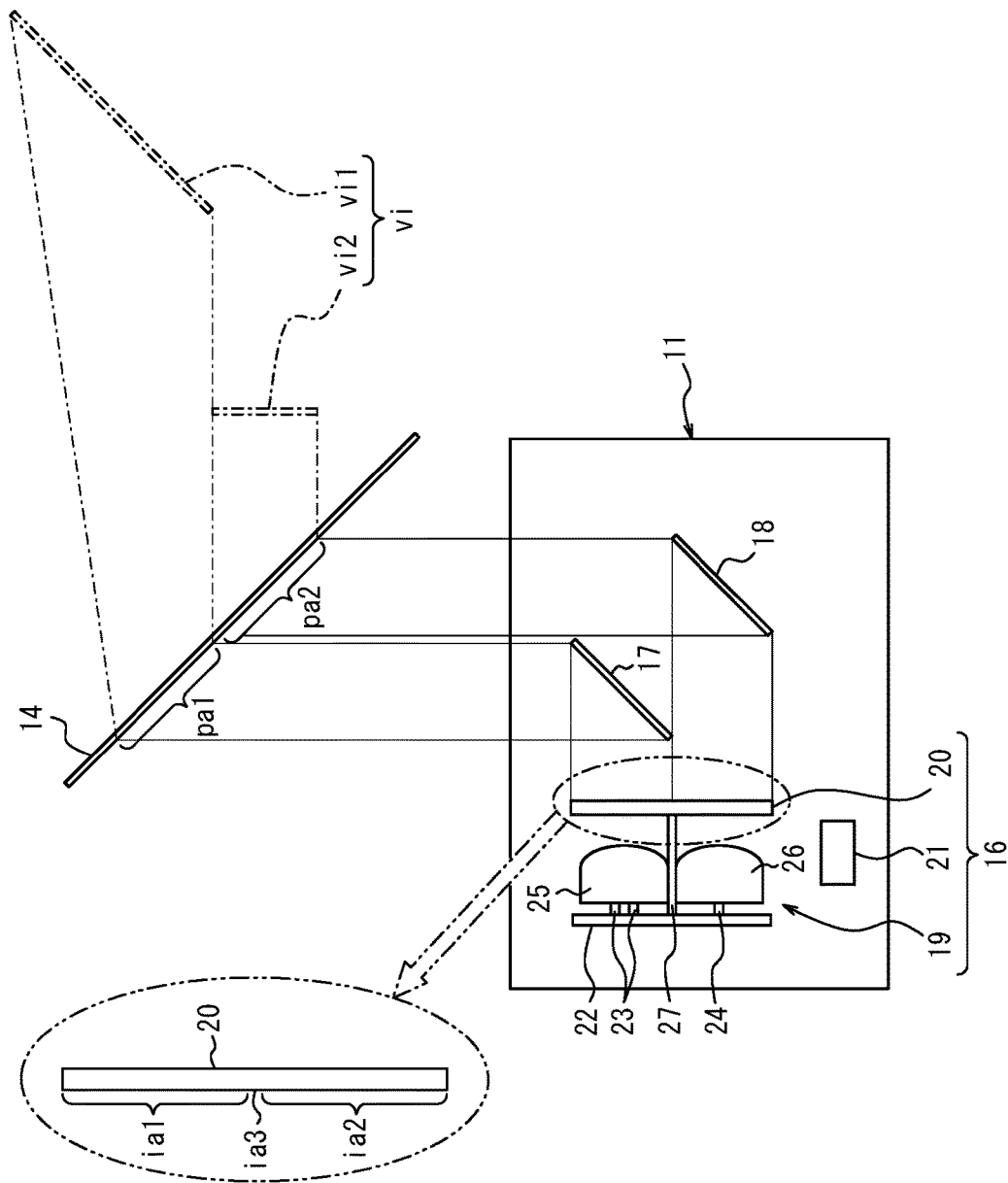
FIG. 2 illustrates the schematic configuration of the display apparatus in FIG. 1.

The display apparatus 11 according to the present embodiments is described in detail with reference to FIG. 2. The display apparatus 11 includes a display device 16, a first projection optical system 17, and a second projection optical system 18.

The display device 16 emits image projection light inside the display apparatus 11. The display device 16 includes a light source apparatus 19, a display panel 20, and a controller 21. For example, the size, shape, arrangement, and the like of the display device 16 and the constituent elements of the display device 16 are not limited to the example in FIG. 2.

The light source apparatus 19 includes a substrate 22, at least one first light-emitting element 23, at least one second light-emitting element 24, a first illumination optical system 25, a second illumination optical system 26, and a light-blocker 27. The substrate 22, the at least one first light-emitting element 23, the at least one second light-emitting element 24, the first illumination optical system 25, the second illumination optical system 26, and the light-blocker 27 may be fixed inside the display device 16.

The substrate 22 may have the at least one first light-emitting element 23 and the at least one second light-emitting element 24 mounted on the same board surface. The mounting region of the at least one first light-emitting element 23 and the mounting region of the at least one second light-emitting element 24 are separated from each other.

The at least one first light-emitting element 23 includes any element that emits light. For example, the at least one first light-emitting element 23 includes a light emission diode (LED), a laser device, or the like. The at least one first light-emitting element 23 irradiates first light. The first light passes through the first illumination optical system 25 towards a first incidence area ia1 of the display panel 20. The first incidence area ia1 is also referred to as a first area. The at least one first light-emitting element 23 may, for example, include a plurality of light emission diodes that emit light of different colors.

The at least one second light-emitting element 24 includes any element that emits light. For example, the at least one second light-emitting element 24 includes an LED, a laser device, or the like. The at least one second light-emitting element 24 irradiates second light. The second light passes through the second illumination optical system 26 towards a second incidence area ia2 of the display panel 20. The second incidence area ia2 is also referred to as a second area. The at least one second light-emitting element 24 may, for example, include a plurality of light emission diodes that emit light of different colors.

The maximum luminance of the second light is smaller than the maximum luminance of the first light. The number of light-emitting elements may differ between the first light-emitting elements 23 and the second light-emitting elements 24. The maximum amount of radiation may differ between the first light-emitting elements 23 and the second light-emitting elements 24. The maximum luminance of the second light that includes the light emitted by one or more second light-emitting elements 24 is less than the maximum luminance of the first light that includes the light emitted by one or more first light-emitting elements 23. In the present embodiments, the number of first light-emitting elements 23 is greater than the number of second light-emitting elements 24. In the present embodiments, the maximum amount of radiation of the individual elements included in the first light-emitting elements 23 may be greater than the maximum amount of radiation of the individual elements included in the second light-emitting elements 24.

The first illumination optical system 25 is positioned on a first optical path over which the first light emitted by the at least one first light-emitting element 23 proceeds. The first illumination optical system 25 includes at least one optical element. The optical element of the first illumination optical system 25 may, for example, include a lens, a mirror, or the like. For example, the first illumination optical system 25 includes a collimator lens. The collimator lens collimates the first light that is emitted from the at least one first light-emitting element 23 and is incident on the first illumination optical system 25.

The second illumination optical system 26 is positioned on a second optical path over which the second light emitted by the at least one second light-emitting element 24 proceeds. The optical axis of the second illumination optical system 26 is separated from the optical axis of the first illumination optical system 25. The second illumination optical system 26 includes at least one optical element. The optical element of the second illumination optical system 26 may, for example, include a lens, a mirror, or the like. For example, the second illumination optical system 26 includes a collimator lens. The collimator lens collimates the second light that is emitted from the at least one second light-emitting element 24 and is incident on the second illumination optical system 26.

The light-blocker 27 blocks light between the first light path and the second light path. The light-blocker 27 may, for example, be a light-blocking plate that extends from the substrate 22 to the display panel 20. The light-blocker 27 separates the first light path from the second light path.

The display panel 20 includes a transmission-type display panel. The transmission-type display panel may, for example, include a liquid crystal display (LCD) or the like. The display panel 20 is positioned on the first optical path and the second optical path.

The display panel 20 includes the first incidence area ia1, the second incidence area ia2, and a third incidence area ia3 on the entrance surface. The third incidence area ia3 is positioned between the first incidence area ia1 and the second incidence area ia2. Less light is incident on the third incidence area ia3 than on the first incidence area ia1 and the second incidence area ia2. The third incidence area ia3 is shielded from light by the light-blocker 27. The third incidence area ia3 is also referred to as a "third area". The first light is incident on the first incidence area ia1. The second light is incident on the second incidence area ia2.

The display panel 20 can display various images in accordance with control by the controller 21. The display panel 20 emits third light toward the first projection optical system 17. The third light is image projection light yielded by the incident first light being transmitted or blocked and then forming an image. Image formation refers to converting uniform light into required image light. The display panel 20 emits fourth light toward the second projection optical system 18. The fourth light is image projection light yielded by the incident second light being transmitted or blocked and then forming an image. The display panel 20 emits the third light and the fourth light from different regions. A region from which little light is emitted exists between the region from which the third light is emitted and the region from which the fourth light is emitted.

The controller 21 includes one or more processors. The term "processor" encompasses general-purpose processors that execute particular functions by reading particular programs and dedicated processors that are specialized for particular processing. The dedicated processor may include an application specific integrated circuit (ASIC). The processor may include a programmable logic device (PLD). The PLD may include a field-programmable gate array (FPGA). The controller 21 may be either a system-on-a-chip (SoC) or a system in a package (SiP) with one processor or a plurality of processors that work together.

The controller 21 controls overall operations of the display device 16. For example, the controller 21 controls the drive voltages of the at least one first light-emitting element 23 and the at least one second light-emitting element 24 separately to cause the at least one first light-emitting element 23 and the at least one second light-emitting element 24 to emit light separately.

Any control method may be adopted for the drive power control of the at least one first light-emitting element 23 and the at least one second light-emitting element 24. For example, the drive power control of the at least one first light-emitting element 23 and the at least one second light-emitting element 24 may include current control, voltage control, and pulse width modulation (PWM) control. When the at least one first light-emitting element 23 and the at least one second light-emitting element 24 include a plurality of light emission diodes that emit light of different colors, the controller 21 can adjust the tone of the at least one first light-emitting element 23 and the at least one second light-emitting element 24. The toning of the at least one first light-emitting element 23 and the at least one second light-emitting element 24 may include drive power control performed for each light emission diode. The controller 21 causes the display panel 20 to display an image. The image may include characters or graphics.

The first projection optical system 17 causes the third light that has passed through the first incidence area ia1 of the display device 16 to reach the outside of the display apparatus 11. The first projection optical system 17 projects the image projection light that is the third light onto a first projection area pa1 of the first optical member 14. The image projection light reaching the eye box 15 via the first projection area pa1 makes a first virtual image vi1 corresponding to the image projection light visible to the user 13.

The second projection optical system 18 causes the fourth light that has passed through the second incidence area ia2 of the display device 16 to reach the outside of the display apparatus 11. The second projection optical system 18 projects the image projection light that is the fourth light onto a second projection area pa2 of the first optical member 14. The image projection light reaching the eye box 15 via the second projection area pa2 makes a second virtual image vi2 corresponding to the image projection light visible to the user 13.

The optical path length of the third light from the display device 16 to the first projection optical system 17 is shorter than the optical path length of the fourth light from the display device 16 to the second projection optical system 18. Light is attenuated and grows dimmer as the optical path length is longer.

The first projection optical system 17 and the second projection optical system 18 may include a mirror that has a convex shape or a concave shape. The first projection optical system 17 and the second projection optical system 18 may include a lens that has a convex shape or a concave shape in at least a portion of the entrance surface or exit surface. At least a portion of the convex shape and the concave shape of the mirror and the lens may be spherical or aspherical. The first projection optical system 17 and the second projection optical system 18 may function as a magnifying optical system that magnifies the image projection light. When magnified, light becomes less dense and dimmer.

The maximum luminance of the first light is greater than the maximum luminance of the second light in the light source apparatus 19 according to the present embodiments. The light source apparatus 19 can make the amount of the third light resulting from the first light being transmitted through the display panel 20 greater than the amount of the fourth light resulting from the second light being transmitted through the display panel 20. When the light source apparatus 19 is applied to the display apparatus 11, the light source apparatus 19 can make the first virtual image vi1 brighter without affecting the brightness of the second virtual image vi2. The light source apparatus 19 therefore improves convenience.

In the light source apparatus 19 of the present embodiments, light emission by at least one of the first light-emitting elements 23 and the second light-emitting elements 24 can be controlled independently from the other. Accordingly, when the light source apparatus 19 is applied to the display apparatus 11, the light source apparatus 19 can adjust the brightness of one of the first virtual image vi1 and the second virtual image vi2, in accordance with the display content, without affecting the brightness of the other.

In the light source apparatus 19 of the present embodiments, light is blocked between the first optical path that the first light travels and the second optical path that the second light travels. Accordingly, when the light source apparatus 19 is applied to the display apparatus 11, the light source apparatus 19 can control the amount of decrease, due to leaked light, in the effect of making one of the first virtual image vi1 and the second virtual image vi2 brighter without affecting the brightness of the other.

In the display apparatus 11 of the present embodiments, the third incidence area ia3 is provided between the first incidence area ia1 and the second incidence area ia2 in the display panel 20. The third incidence area ia3 is shielded from light. Accordingly, the display apparatus 11 reduces the amount of light irradiated onto the boundary between the first projection area pa1 and the second projection area pa2 of the first optical member 14, onto which the first projection optical system 17 and the second projection optical system 18 respectively project light. The display apparatus 11 can therefore make the boundary between the first virtual image vi1 and the second virtual image vi2 clearly visible to the user 13.

The optical path length of the third light from the display panel 20 to the first projection optical system 17 is shorter than the optical path length of the fourth light from the display panel 20 to the second projection optical system 18 in the display apparatus 11 of the present embodiments. The display apparatus 11 can therefore make the second virtual image vi2 visible closer to the user 13 than the first virtual image vi1.

Second Embodiments

Second embodiments of the present disclosure is described. Demand exists for increasing the convenience of techniques for making a virtual image of a three-dimensional image visible to a subject. It is an objective of the present embodiments to provide a three-dimensional projection apparatus, a three-dimensional projection system, and a vehicle that increase the convenience of a technique for making a virtual image of a three-dimensional image visible to a subject. The present embodiments can increase the convenience of techniques for making a virtual image of a three-dimensional image visible to a subject.

Vehicle

Figure 3:
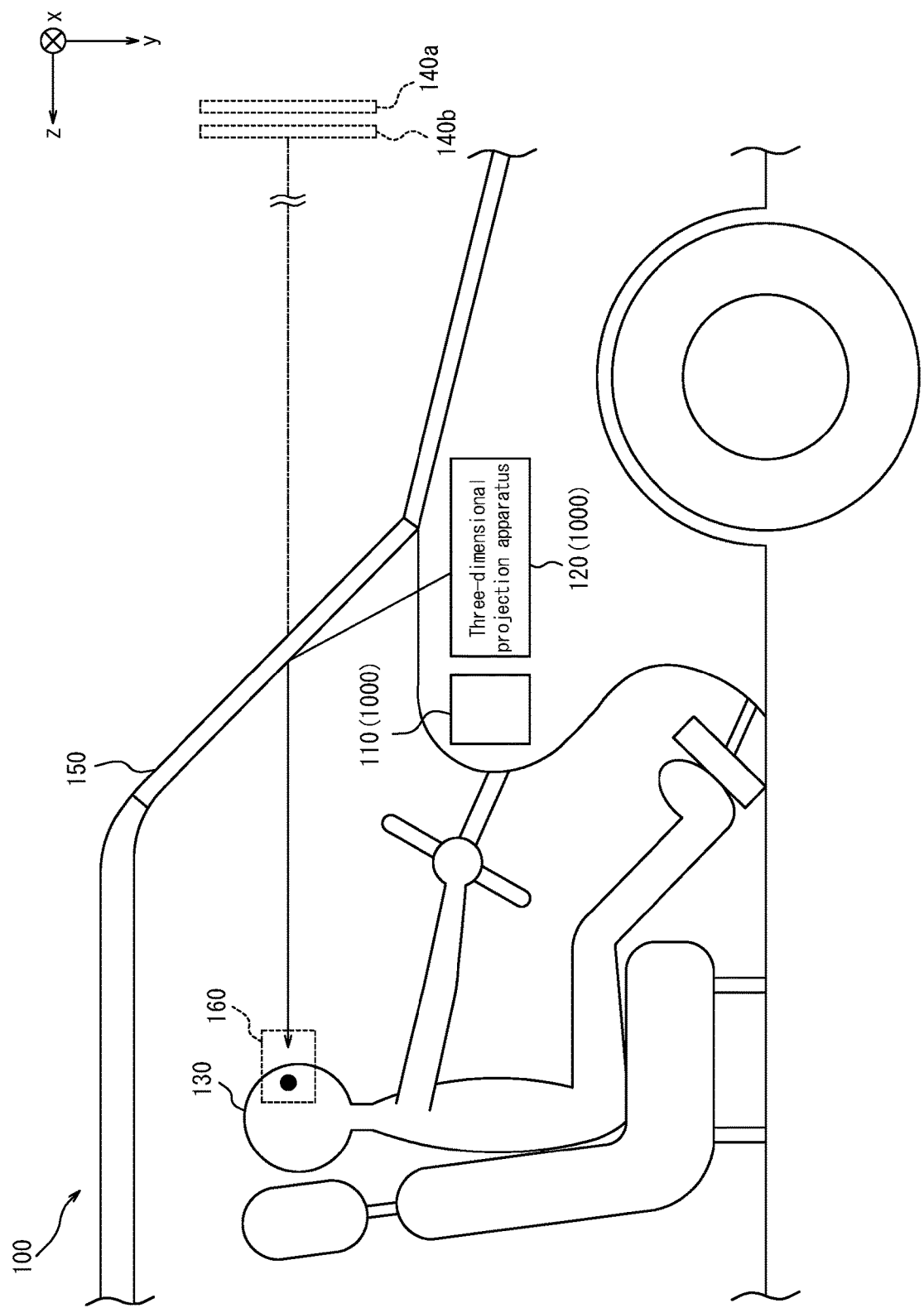
FIG. 3 illustrates a three-dimensional projection system mounted in a vehicle according to second embodiments of the present disclosure.

A vehicle 100 according to the present embodiments is now described with reference to FIG. 3. The vehicle 100 can be mounted in a three-dimensional projection system 1000. The three-dimensional projection system 1000 includes a detection apparatus 11 and a three-dimensional projection apparatus 12. In FIG. 3, the direction connecting the eyes of the subject is the x-axis direction, the vertical direction is the y-axis direction, and the direction orthogonal to the x-axis direction and the y-axis direction is the z-axis direction.

A detection apparatus 110 can detect the position of the eyes of a subject 130. The detection apparatus 110 can transmit the detected position of the eyes to the three-dimensional projection apparatus 120. The detection apparatus 110 may be at any position inside or outside of the vehicle 100. For example, the detection apparatus 110 may be located in the dashboard of the vehicle 100. The detection apparatus 110 may output information indicating the position of the eyes to the three-dimensional projection apparatus 12 in a wired or wireless manner, over a controller area network (CAN), or the like.

The detection apparatus 110 may include an imaging apparatus. The imaging apparatus may, for example, include a charge coupled device (CCD) image sensor or a complementary metal-oxide semiconductor (CMOS) image sensor. The imaging apparatus can capture a facial image of the subject 130. The imaging range of the imaging apparatus includes at least an eye box 160, described below. The subject 130 may, for example, be the driver of the vehicle 100.

The detection apparatus 110 can detect the position of both eyes of the subject 130 in actual space based on the captured image generated by the imaging apparatus. Any algorithm using the captured image may be adopted to detect the position of both eyes of the subject 130 in actual space.

For example, the detection apparatus 110 can store correspondence information in advance. The correspondence information associates a combination of the position of the face of the subject 130, the orientation of the face, and the size of the face in the captured image with the position of both eyes of the subject 130 in actual space. The correspondence information can be determined by experiment or simulation, for example. The correspondence information may be stored as a lookup table, for example. The detection apparatus 110 can detect the position of the face of the subject 130, the orientation of the face, and the size of the face in the captured image. A method using pattern matching or a method to extract feature points of the subject 130 in the captured image, for example, may be adopted to detect the face and eyes. From the correspondence information, the detection apparatus 110 can extract the position of both eyes of the subject 130, in actual space, that can correspond to the combination of the position of the face of the subject 130, the orientation of the face, and the size of the face detected in the captured image. The detection apparatus 110 can detect the extracted positions as the position of both eyes of the subject 130 in actual space.

Instead of including an imaging apparatus, the detection apparatus 110 may be connected to an imaging apparatus. The detection apparatus 110 may include an input terminal for input of a signal from the imaging apparatus. In this case, the imaging apparatus may be connected directly to the input terminal. The detection apparatus 110 may be connected indirectly to the input terminal over a shared network. The detection apparatus 110 may detect the position of the eyes of the subject 130 from a video signal inputted to the input terminal.

The detection apparatus 110 may, for example, include a sensor. The sensor may be an ultrasonic sensor, an optical sensor, or the like. The detection apparatus 110 may detect the position of the head of the subject 130 with the sensor and detect the position of the eyes of the subject 130 based on the position of the head. The detection apparatus 110 may use two or more sensors to detect the position of the eyes of the subject 130 as coordinates in three-dimensional space.

The three-dimensional projection apparatus 120 makes a virtual image 140 visible to the subject 130 of the vehicle 100, for example. The virtual image 140 may include a first virtual image 140a and a second virtual image 140b. The first virtual image 140a is a virtual image displayed by a display 200, described below. The second virtual image 140b is a virtual image of a parallax barrier 210, described below. The three-dimensional projection apparatus 120 in the present embodiments can emit image light, described below, towards a predetermined region of a first optical member 150 included in the vehicle 100. The emitted image light is reflected in the predetermined region of the first optical member 150 and reaches the eyes of the subject 130. The three-dimensional projection apparatus 120 can function as a head-up display in this way. In the present embodiments, the first optical member 150 may be a windshield. In another embodiment, the first optical member 150 may be a combiner.

The three-dimensional projection apparatus 120 may be at any position inside or outside of the vehicle 100. For example, the three-dimensional projection apparatus 120 may be located in the dashboard of the vehicle 100. The three-dimensional projection apparatus 120 can project an image onto the first optical member 150 provided in the vehicle 100. Specifically, the three-dimensional projection apparatus 120 may emit image light towards a predetermined region of the first optical member 150.

The first optical member 150 can reflect the image light from the three-dimensional projection apparatus 120 in the predetermined region. Image light reflected in the predetermined region of the first optical member 150 reaches the eye box 160. The eye box 160 is a region in actual space in which it is assumed that the eyes of the subject 130 can be located, taking into consideration the physique, posture, change in posture, and the like of the subject 130, for example. The eye box 160 may have any shape. The eye box 160 may include a flat or three-dimensional region. The solid arrow in FIG. 3 indicates the path over which a portion of the image projection light emitted from the three-dimensional projection apparatus 120 reaches the eye box 160. The path traveled by image light is also referred to as the optical path. When the eyes of the subject 130 are inside the eye box 160 and image light reaches the eye box 160, the subject 130 can see the virtual image 140. The virtual image 140 can be visible in front of the vehicle 100, for example.

The first optical member 150 may include a windshield, a combiner, or the like. When the three-dimensional projection apparatus 120 includes the first optical member 150, the three-dimensional projection apparatus 120 can form a head-up display.

Image Projection Apparatus

Figure 4:
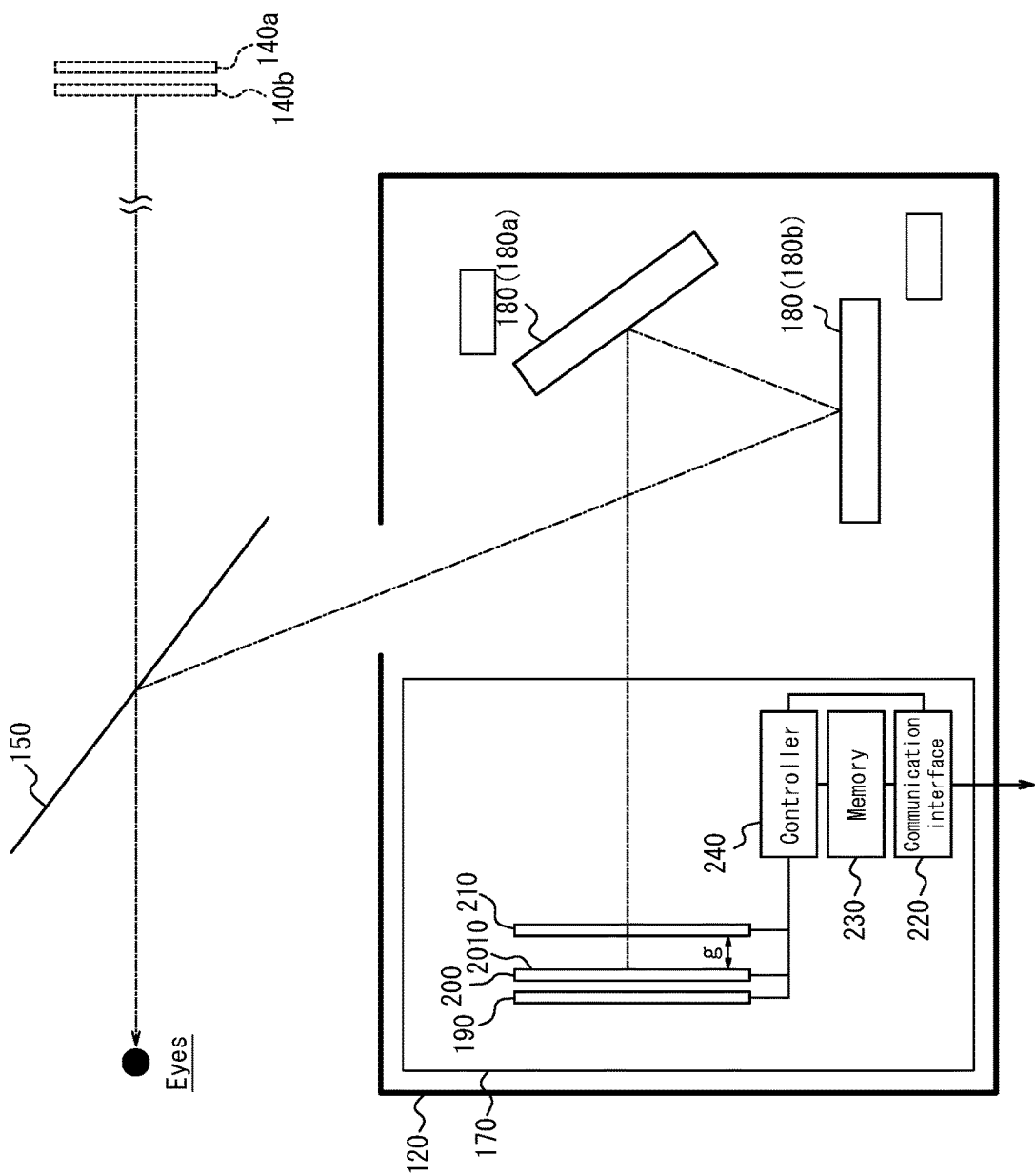
FIG. 4 illustrates the schematic configuration of the three-dimensional projection apparatus illustrated in FIG. 3.

The three-dimensional projection apparatus 120 is described in detail with reference to FIG. 4. The three-dimensional projection apparatus 120 includes a three-dimensional display apparatus 170 and one or more second optical members 180 (optical member). FIG. 4 illustrates an example configuration in which the three-dimensional projection apparatus 120 includes two second optical members 180a, 180b. FIG. 4 schematically illustrates an example configuration of the three-dimensional projection apparatus 120. For example, the size, shape, arrangement, and the like of the three-dimensional projection apparatus 120 and the constituent elements of the three-dimensional projection apparatus 120 are not limited to the example in FIG. 4.

Second Optical Member

The second optical member 180 projects an image, displayed on a display surface 201@ of the display 200 included in the three-dimensional display apparatus 170, onto the first optical member 150 to make a first virtual image 140a of the image visible to the subject 130. The second optical member 180 projects the parallax barrier 210 included in the three-dimensional display apparatus 170 onto the first optical member 150 to make a second virtual image 140b of the parallax barrier 210 visible to the subject 130.

Specifically, the second optical member 180 causes the light emitted from the three-dimensional display apparatus 170 to reach the outside of the three-dimensional projection apparatus 120. In the example in FIG. 4, the second optical members 180a, 180b cause the light emitted from the three-dimensional display apparatus 170 to reach the outside of the three-dimensional projection apparatus 120. The second optical member 180 may include a lens or a mirror. For example, the second optical members 180a, 180b may each include a mirror. At least one of the second optical members 180a, 180b may include a lens. One of the second optical members 180a, 180b may be a mirror and the other a lens. The dashed dotted arrow in FIG. 4 indicates the path over which a portion of the light emitted from the three-dimensional display apparatus 170 is reflected by the second optical members 180a, 180b, passes through a window provided in the housing of the three-dimensional projection apparatus 120, and reaches the outside of the three-dimensional projection apparatus 120. The light reaching the outside of the three-dimensional projection apparatus 120 can reach the predetermined region of the first optical member 150.

The second optical member 180 may function as a magnifying optical system that magnifies the image displayed by the three-dimensional display apparatus 170. For example, at least one of the second optical members 180a, 180b may be a mirror having a convex shape or a concave shape in at least a portion of the surface that the light reaches. At least one of the second optical members 180a, 180b may be a lens having a convex shape or a concave shape in at least a portion of the entrance surface or exit surface of the light. At least a portion of the convex shape and the concave shape may be spherical or aspherical.

Three-Dimensional Display Apparatus

The three-dimensional display apparatus 170 is described in detail with reference to FIG. 4. The three-dimensional display apparatus 170 may be located inside the three-dimensional projection apparatus 120. The three-dimensional display apparatus 170 includes an irradiator 190, the display 200, the parallax barrier 210 (optical element), a communication interface 220, a memory 230, and a controller 240. FIG. 4 schematically illustrates an example configuration of the three-dimensional display apparatus 170. For example, the size, shape, arrangement, and the like of the three-dimensional display apparatus 170 and the constituent elements of the three-dimensional display apparatus 170 are not limited to the example in FIG. 4.

Figure 5:
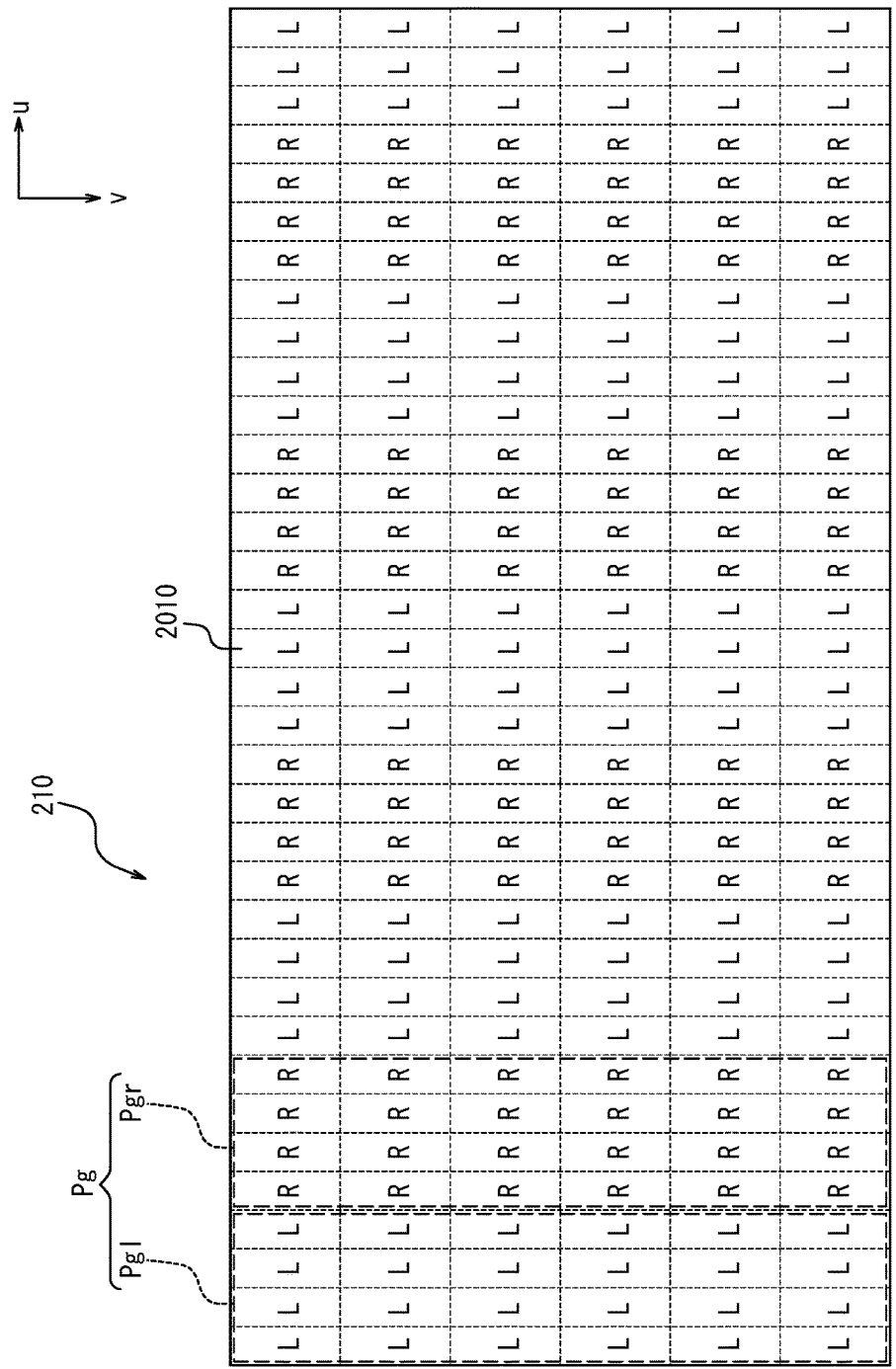
FIG. 5 is a view of a display illustrated in FIG. 4 from the normal direction of a display surface.

The display 200 is a display device. Any display panel, such as a transmission-type liquid crystal display panel, can be adopted as the display 200. As illustrated in FIG. 5, the display 200 has a plurality of regions partitioned on the plate-like display surface 2010 in a first direction and a second direction substantially orthogonal to the first direction. The first direction may be referred to as the horizontal direction. The second direction may be referred to as the vertical direction. The first and second directions are not, however, limited to these examples. In the drawings, the first direction is represented as the u-axis direction and the second direction as the v-axis direction. The u-axis direction of the image displayed by the display surface 2010 can correspond to the x-axis direction in the first virtual image 140a of the image.

One subpixel corresponds to each partitioned region. Accordingly, the display surface 2010 includes a plurality of subpixels arranged in a grid along the horizontal direction and the vertical direction. Each subpixel corresponds to one of the colors R, G, B. The combination of the three subpixels R, G, B can form one pixel. The horizontal direction is, for example, the direction in which the plurality of subpixels forming one pixel are aligned. The vertical direction is, for example, the direction in which subpixels of the same color are aligned. The display 200 is not limited to a transmission-type liquid crystal panel. Another display panel, such as an organic EL display panel, can be adopted. When a self-luminous display panel is adopted as the display 200, the three-dimensional display apparatus 170 need not include the irradiator 190.

As described above, a plurality of subpixels arranged on the display surface 2010 form a subpixel group Pg. The subpixel group Pg includes a right subpixel group Pgr (first subpixel group) and a left subpixel group Pgl (second subpixel group). The right subpixel group Pgr and the left subpixel group Pgl are arranged next to each other in the horizontal direction. A plurality of subpixel groups Pg are repeatedly arranged next to each other in the horizontal direction.

The right subpixel group Pgr includes subpixels in predetermined lines. Specifically, the right subpixel group Pgr includes a predetermined consecutive number, in the horizontal direction, of vertical lines of continuous subpixels displaying a right eye image (first image). The left subpixel group Pgl includes subpixels in predetermined lines. Specifically, the left subpixel group Pgl includes a predetermined consecutive number, in the horizontal direction, of vertical lines of continuous subpixels displaying a left eye image (second image). The right eye image is an image to be made visible to the right eye (first eye) of the subject 130. The left eye image is an image to be made visible to the left eye (second eye) of the subject 130.

In the example illustrated in FIG. 5, a left subpixel group Pgl that includes four consecutive lines, in the horizontal direction, of subpixels is arranged on the display surface 2010. A right subpixel group Pgr that includes four consecutive lines, in the horizontal direction, of subpixels is arranged on the display surface 2010 adjacent to the left subpixel group Pgl in the horizontal direction.

Figure 6:
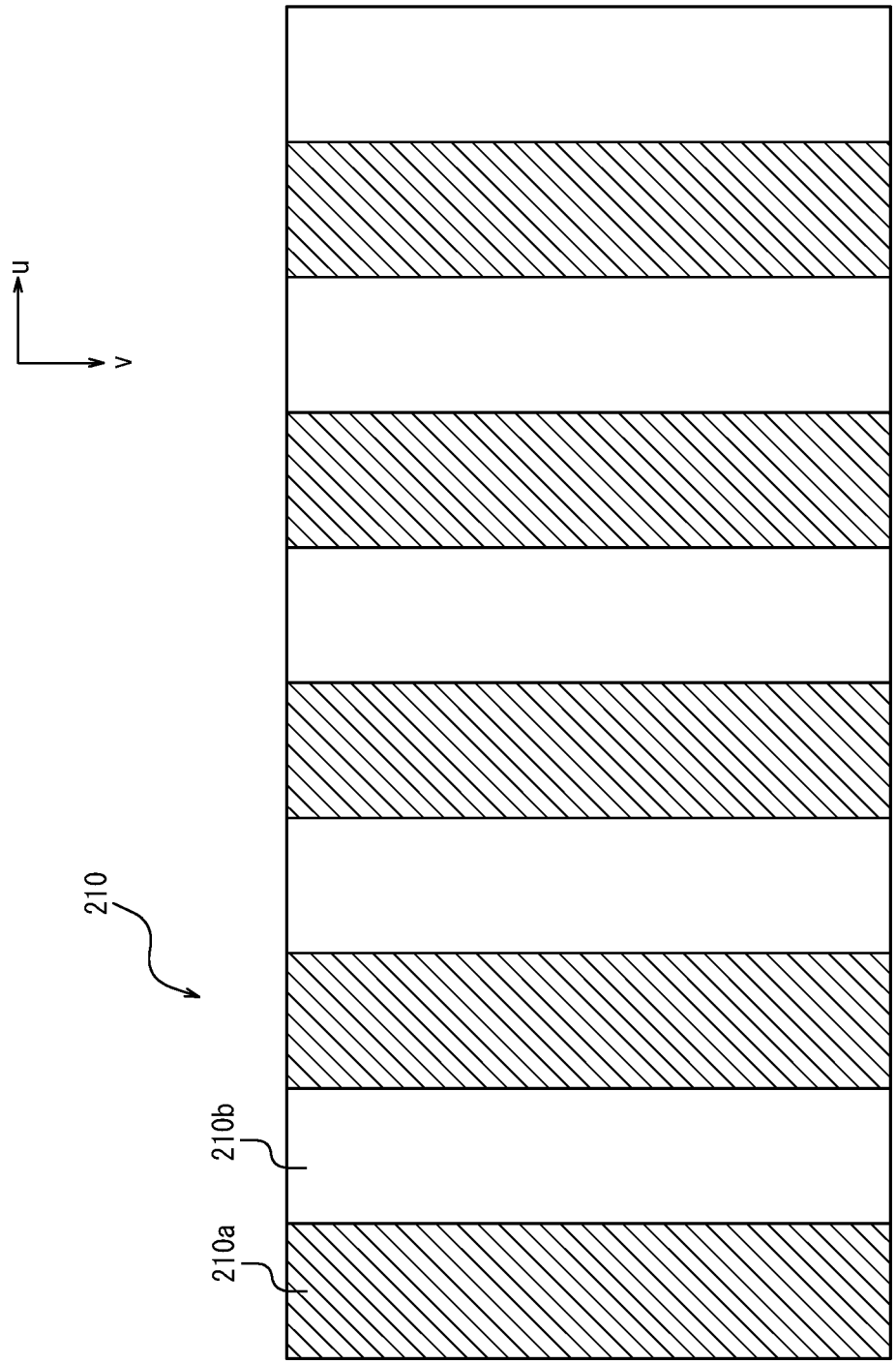
FIG. 6 is a view of a parallax barrier illustrated in FIG. 4 from the normal direction of a light-blocking surface.

As illustrated in FIG. 6, the parallax barrier 210 can define the light beam direction, which is the propagation direction of image light emitted from the subpixels, for each of a plurality of open regions 210b, which are strip-shaped regions extending in the vertical direction. The regions, on the display surface 201, containing the subpixels that emit image light reaching the eyes of the subject 130 are determined by the parallax barrier 210 prescribing the light beam direction of image light emitted from the subpixels.

Specifically, the parallax barrier 210 is formed by a flat surface along the display surface 2010, as illustrated in FIG. 4. The parallax barrier 210 is arranged at a predetermined distance (gap) g from the display surface 2010. The parallax barrier 210 can be positioned on the opposite side of the display 200 from the irradiator 190. The parallax barrier 210 can be positioned on the irradiator 190 side of the display 200.

As illustrated in FIG. 6, the parallax barrier 210 includes a plurality of light-blocking surfaces 210a that block the image light. The plurality of light-blocking surfaces 210a can define the open region 210b between adjacent light-blocking surfaces 210a. The open regions 210b have a higher light transmittance than the light-blocking surfaces 210a. The light-blocking surfaces 210a have a lower light transmittance than the open regions 210b. The open regions 210b are portions for transmitting light that can be incident on the parallax barrier 210. The open regions 210b may transmit light at a transmittance of a first predetermined value or greater. The first predetermined value may, for example, be 100% or a value near 100%. The light-blocking surfaces 210a are non-light transmissive portions for blocking light that can be incident on the parallax barrier 210. In other words, the light-blocking surfaces 210a block the image displayed on the display 200. The light-blocking surfaces 210a may block light at a transmittance of a second predetermined value or less. The second predetermined value may, for example, be 0% or a value near 0%.

The open regions 210b and the light-blocking surfaces 210a extend in the vertical direction along the display surface 2010 and are arranged to alternate in the horizontal direction. The open regions 210b can define the light beam direction of image light emitted from the subpixels.

The parallax barrier 210 may be configured by a liquid crystal shutter. The liquid crystal shutter can control the transmittance of light in accordance with an applied voltage. The liquid crystal shutter may be configured by a plurality of pixels and control the transmittance of light in each pixel.

The liquid crystal shutter can be formed so that regions with high transmittance of light or regions with low transmittance of light have any shape. When the parallax barrier 210 is formed by a liquid crystal shutter, the open regions 200b may be regions having a transmittance of the first predetermined value or greater. When the parallax barrier 210 is formed by a liquid crystal shutter, the light-blocking surfaces 210a may be regions having a transmittance of the second predetermined value or less.

Figure 7:
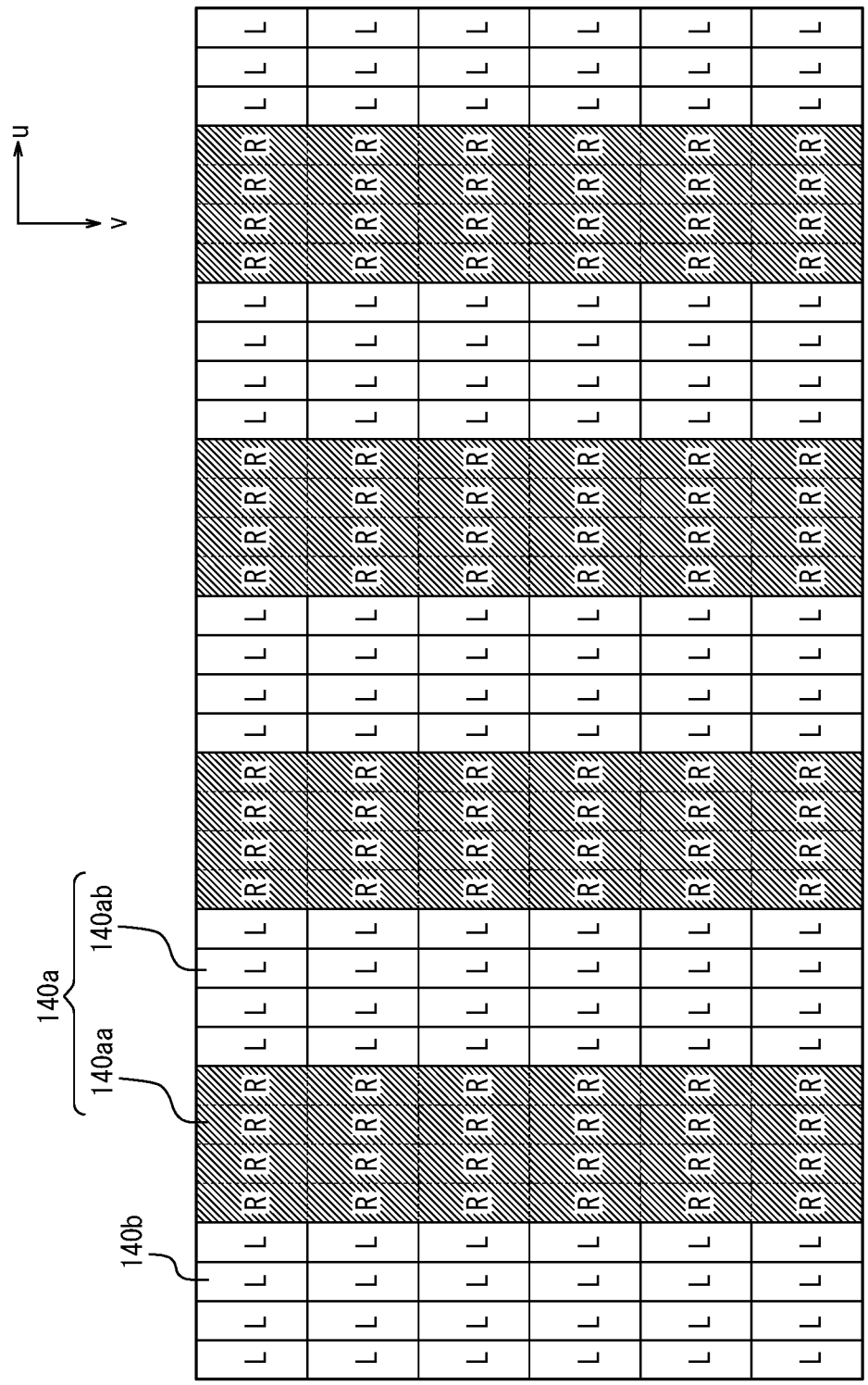
FIG. 7 is a view of the display and the parallax barrier illustrated in FIG. 4 from the parallax barrier side.

A portion of the image light emitted from the display surface 2010 of the display 200 can be transmitted by the parallax barrier 210 and reach the first optical member 150 through the second optical members 180a, 180b. The image light may then be reflected by the first optical member 150 and reach the eyes of the subject 130. Consequently, the eyes of the subject 130 can recognize the first virtual image 140a of the display 200 in front of the first optical member 150. In the present application, the front is the direction of the first optical member 150 as seen from the subject 130. The front is the direction in which the vehicle 100 normally moves. The parallax barrier 210 forms the second virtual image 140b in front of the first optical member 150 on the first optical member 150 side of the first virtual image 140a. As illustrated in FIG. 7, the subject 130 can see an image in which the display 200 appears to be at the position of the first virtual image 140a and the parallax barrier 210 appears to be at the position of the second virtual image 140b.

FIG. 7 illustrates the subpixels of the first virtual image 140a, of the display 200, that can be observed by the subject 130. Subpixels labeled L display a virtual image of the left eye image. Subpixels labeled R display a virtual image of the right eye image. Furthermore, FIG. 7 illustrates a left eye visible region 140a a and a left eye invisible region 140a b of the first virtual image 140a observed from the left eye of the subject 130.

Figure 8:
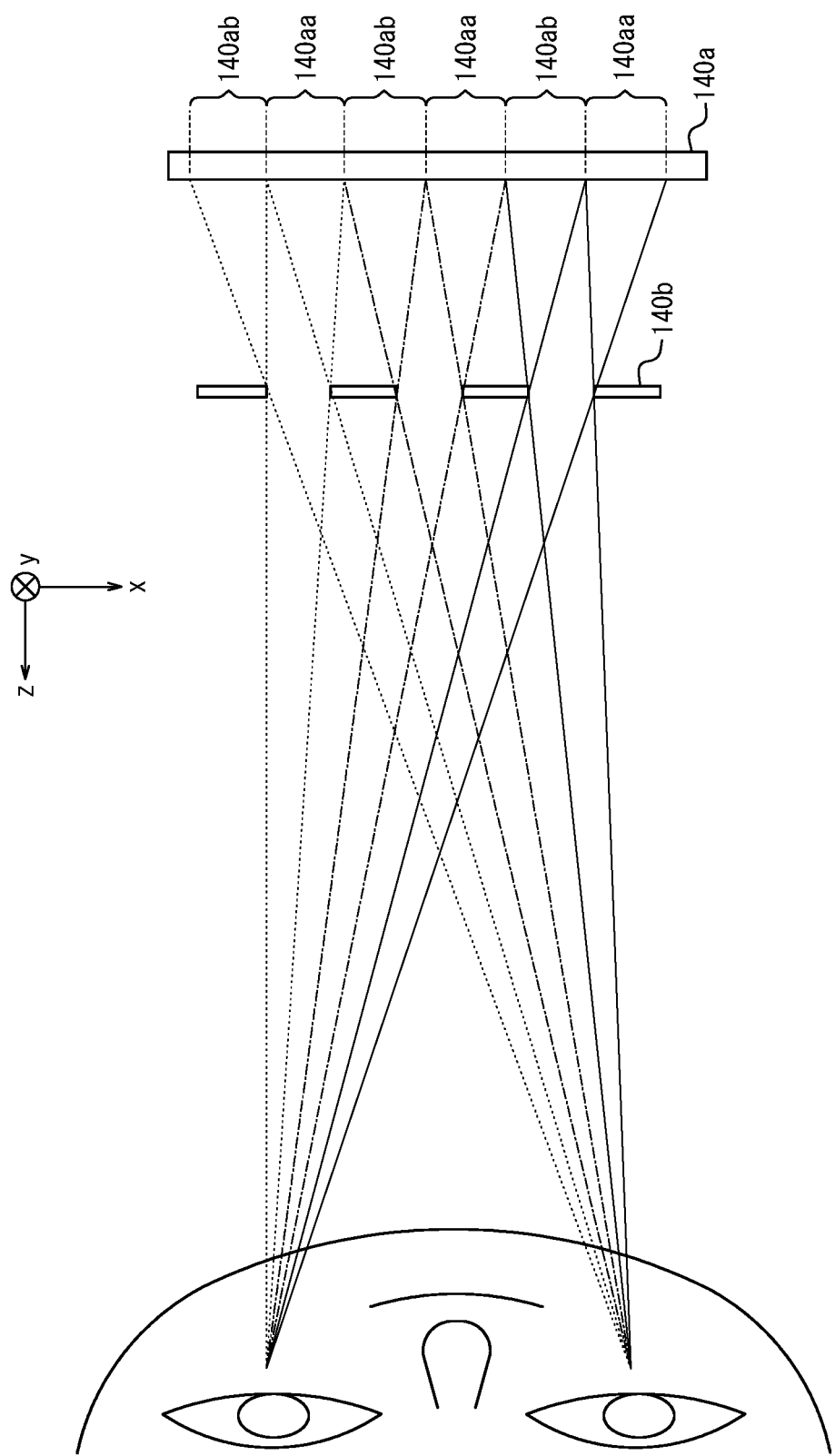
FIG. 8 schematically illustrates the relationship between the eyes of a subject and a virtual image.

A more detailed description is provided now with reference to FIG. 8. The visible regions 140a a are regions of the first virtual image 140a visible to the left eye as a result of image light being emitted from the display surface 2010, passing through the open region 210b of the parallax barrier 210, and reaching the left eye. The invisible regions 140a b are regions of the first virtual image 140a in which image light is not visible to the left eye, due to the image light emitted from the display surface 2010 being blocked by the light-blocking surfaces 210a of the parallax barrier 210. At this time, the right eye of the user does not see the left eye visible regions 140a a in the first virtual image 140a. The right eye of the user can see the left eye invisible regions 140a b that display a virtual image of the right eye image in the first virtual image 140a. Accordingly, the right eye of the subject 130 sees the right eye image but does not see the left eye image.

In this way, the right eye of the subject 130 can see the right eye image. The left eye of the subject 130 can see the left eye image. Accordingly, when the left eye image and the right eye image have parallax, the subject 130 can see a three-dimensional image.

The communication interface 220 may include an interface capable of communicating with an external apparatus. The external apparatus may, for example, include the detection apparatus 110. The "communication interface" in the present disclosure may, for example, encompass physical connectors and wireless communication devices. Physical connectors may include an electrical connector corresponding to transmission by an electric signal, an optical connector corresponding to transmission by an optical signal, and an electromagnetic connector corresponding to transmission by electromagnetic waves. Electrical connectors may include connectors conforming to IEC60603, connectors conforming to the USB standard, connectors comprising RCA terminals, connectors comprising S terminals specified by EIAJ CP-121aA, connectors comprising D terminals specified by EIAJ RC-5237, connectors conforming to the HDMI® (HDMI is a registered trademark in Japan, other countries, or both) standard, and connectors comprising a coaxial cable that includes a BNC connector (British naval connector or baby-series N connector). Optical connectors may include a variety of connectors conforming to IEC 61754. Wireless communication devices may encompass wireless communication devices conforming to standards including Bluetooth® (Bluetooth is a registered trademark in Japan, other countries, or both) and IEEE 8021a. The wireless communication device includes at least one antenna.

The memory 230 may include a temporary memory device and a secondary memory device. The memory 230 may, for example, be configured using a semiconductor memory, a magnetic memory, an optical memory, or the like. The semiconductor memory may include volatile memory and non-volatile memory. The magnetic memory may, for example, include a hard disk, magnetic tape, or the like. The optical memory may, for example, include a compact disc (CD), a digital versatile disc (DVD), a Blu-ray® (BD) Disc® (Blu-ray and Blu-ray Disc are registered trademarks in Japan, other countries, or both), or the like. The memory 230 can store various information and programs necessary for operation of the three-dimensional display apparatus 170.

For example, the memory 230 may store a plurality of pieces of correction information corresponding to a plurality of positions in actual space. The plurality of positions are also referred to below as reference positions. Details of the correction information are provided below. FIG. 9 illustrates n pieces of correction information P1 to Pn corresponding to n reference positions in actual space. The n reference positions may be indicated as 3D orthogonal coordinates or 3D polar coordinates with an arbitrary position in the vehicle 100 as the origin. The reference positions in actual space corresponding to the pieces of correction information may exist inside or outside of the eye box 160. For example, when the eye box 160 is a hexahedron, the plurality of reference positions may include the positions of the eight vertices of the hexahedron. The plurality of reference positions may include the positions of the eight vertices of a first hexahedron that is larger than the eye box 160 and that can include the eye box 160. The plurality of reference positions may include the positions of the eight vertices of a second hexahedron that is smaller than the eye box 160 and is included in the eye box 160. A plurality of second hexahedrons may be included inside the eye box 160. The plurality of reference positions may include any position within, or on the sides of, the first hexahedron or the second hexahedron. In an example, the memory 230 may store a plurality of pieces of correction information corresponding to a plurality of reference positions located inside the eye box 160.

The correction information is now described in detail. As described above, the subject 130 can see a virtual image 140 of an image displayed by the display 200 as a result of image light being reflected by the first optical member 150 and reaching the eye box 160. The surface shape of the first optical member 150 may, for example, be designed in accordance with the vehicle 100 to which the first optical member 150 is attached and need not be flat. Furthermore, when the first optical member 150 is attached to the vehicle 100, a bending, twisting, or other such force is applied to the first optical member 150 due to the rigidity of the vehicle 100, which may cause the first optical member 150 to be distorted. Therefore, the shape of the virtual image 140 seen by the subject 130 may be distorted depending on the position of the eyes of the subject 130 that sees the virtual image 140.

The correction information is used to correct distortion of the shape of the first virtual image 140a and the second virtual image 140b in accordance with the position of the eyes of the subject 130. The correction information may include information to change the shape of the image displayed by the display 200 so as to reduce distortion of the shape of the first virtual image 140a and the second virtual image 140b. For example, the correction information may include information indicating a shift amount of each of a plurality of feature points on the image displayed by the display 200. The arrangement of the plurality of feature points on the image may be determined freely. For example, the plurality of feature points may be arranged in a grid with freely chosen intervals. The plurality of feature points may correspond to a plurality of pixels displaying the image. Correction based on the correction information allows the image displayed by the display 200 to be deformed so that, for example, the feature points on the image are respectively moved by the shift amounts indicated in the correction information. For example, the image to be displayed by the display 200 can be deformed evenly or unevenly by correction using the correction information and then displayed by the display 200. The image light of the image deformed based on the correction information allows the subject 130 to see a virtual image 140 with reduced distortion. The correction information can be determined by experiment or simulation, for example.

The controller 240 includes one or more processors. The term "processor" encompasses general-purpose processors that execute particular functions by reading particular programs and dedicated processors that are specialized for particular processing. The controller 240 may be either an SoC or an SiP with one processor or a plurality of processors that work together.

The controller 240 can control operations of the irradiator 190, the display 200, and the parallax barrier 210. For example, the controller 240 can control the drive power of the irradiator 190 to cause the irradiator 290 to emit light. The controller 240 can cause the display 200 to display an image. The image may include characters or graphics. The controller 240 can control the voltage applied to the liquid crystal shutter forming the parallax barrier 210 to control the transmittance of light in the parallax barrier 210. The processing of the controller 240 to control the display 200 and the parallax barrier 210 is described below in detail.

The controller 240 can acquire information related to the position of the eyes of the subject 130 from the detection apparatus 110 through the communication interface 220. The controller 240 can acquire a captured image from an imaging apparatus included in the detection apparatus 110. In this case, the controller 240 can detect the position of both eyes of the subject 130 in actual space based on the acquired captured image.

The controller 240 can dynamically correct the right eye image and the left eye image, displayed by the display 200, in accordance with the eye positions indicated by the acquired information. The controller 240 can dynamically correct the parallax barrier 210 in accordance with the eye positions. Any algorithm to correct the image may be adopted. A specific example of the controller 240 using an algorithm to correct an image is described below.

Overall, the controller 240 can use an algorithm to determine first correction information corresponding to the position of the right eye of the subject 130 and second correction information corresponding to the position of the left eye of the subject 13. The controller 240 can correct the right eye image based on the first correction information. The controller 240 can correct the left eye image based on the second correction information. The controller 240 can generate third correction information based on the first correction information and the second correction information. The controller 240 can dynamically correct the parallax barrier 210 based on the generated third correction information. Details are provided below.

The controller 240 can determine the first correction information corresponding to the position of the right eye of the subject 130. For example, the controller 240 may determine the first correction information by selection from among a plurality of pieces of correction information stored in the memory 230. Alternatively, the controller 240 may determine the first correction information by generating the first correction information based on two or more pieces of correction information. Any algorithm to generate the first correction information may be adopted.

In the example in FIG. 10, the right eye $E_R$ of the subject 130 is positioned inside a hexahedron that has eight reference positions as vertices, correction information being associated with each reference position. In this case, the controller 240 can generate the first correction information corresponding to the position of the right eye $E_R$ by interpolation based on two or more pieces of correction information among the eight pieces of correction information located near the right eye $E_R$.

In the example in FIG. 11, the right eye $E_R$ of the subject 130 is positioned outside a hexahedron that has eight reference positions as vertices, correction information being associated with each reference position. In this case, the controller 240 can generate the first correction information corresponding to the position of the right eye $E_R$ by extrapolation based on two or more pieces of correction information among the eight pieces of correction information located near the right eye $E_R$.

The first correction information is generated by interpolation or extrapolation in this configuration. This can reduce the number of reference positions for which correction information needs to be stored and can reduce the volume of the correction information that needs to be stored in the memory 230.

The controller 240 can determine the second correction information corresponding to the position of the left eye of the subject 130. For example, the controller 240 may determine the second correction information corresponding to the position of the left eye of the subject 130 by selection from among a plurality of pieces of correction information stored in the memory 230. Alternatively, the controller 240 may determine the second correction information corresponding to the position of the left eye of the subject 130 by generating the second correction information based on two or more pieces of correction information. The second correction information may be generated in the same way as the above-described generation of the first correction information. When the left eye $E_L$ of the subject 130 is positioned inside a hexahedron, as illustrated in the example in FIG. 10, the controller 240 can generate the second correction information corresponding to the position of the left eye $E_L$ by interpolation. When the left eye $E_L$ of the subject 130 is positioned outside a hexahedron, as illustrated in the example in FIG. 11, the controller 240 can generate the second correction information corresponding to the position of the left eye EL by extrapolation.

The controller 240 can generate third correction information based on the first correction information and the second correction information. Any algorithm to generate the third correction information may be adopted. For example, the controller 240 can generate the third correction information by weighting each of the first correction information and the second correction information. Specifically, a shift amount S3, indicated by the third correction information, of a feature point on the image is determined by Equation (1) below.

$$S3 = \alpha \times S1 + (1-\alpha) \times S2 \quad (1)$$

In Equation (1), $\alpha$ represents a weighting factor having a value of 0 or more and 1 or less. S1 represents the shift amount of the feature point as indicated in the first correction information. S2 represents the shift amount of the feature point as indicated in the second correction information. For example, when the weighting factor $\alpha$ is 0.3, the shift amount S1 is +10 for a certain feature point, and the shift amount S2 is −10 for the feature point, then the shift amount S3 for the feature point as indicated in the third correction information is $S3 = 0.3 \times (+10) + 0.7 \times (-10) = -4$.

The weighting factor $\alpha$ may be freely determined in a range of 0 or more and 1 or less. For example, the weighting factor $\alpha$ may be determined in advance. Alternatively, the weighting factor $\alpha$ may be determined taking into consideration the dominant eye of the subject 130.

The determination of the weighting factor $\alpha$ that takes into consideration the dominant eye of the subject 130 may, for example, be made before the subject 130 drives the vehicle 10. A method of determining the weighting factor $\alpha$ is described below. The controller 240 can acquire information related to the position of both eyes from the detection apparatus 110. The controller 240 can determine the first correction information and the second correction information on the basis the position of both eyes indicated by the acquired information. The controller 240 can set the weighting factor $\alpha$ to an initial value. The controller 240 can generate the third correction information based on the first correction information, the second correction information, and the weighting factor $\alpha$. The controller 240 causes the display 200 to display a reference image corrected using the generated third correction information. The reference image is an image prepared in advance for determining the weighting factor $\alpha$. Any image may be adopted as the reference image. For example, the reference image may include a square, circle, a plurality of lines arranged in a grid, or the like.

The controller 240 changes the weighting factor $\alpha$ in accordance with operation by the subject 130 who observed the reference image displayed as the first virtual image 140a, for example. When the weighting factor $\alpha$ is changed, the controller 240 can newly generate the third correction information based on the first correction information, the second correction information, and the changed weighting factor $\alpha$. The controller 240 causes the display 200 to display a reference image corrected using the newly generated third correction information. In accordance with operations, the weighting factor $\alpha$ may be changed, and the reference image that is corrected using the newly generated third correction information may be displayed, a plurality of times. The controller 240 can finalize the weighting factor $\alpha$ and store the weighting factor $\alpha$ in the memory 230 in accordance with an operation by the subject 130, for example.

When, for example, the subject 130 drives the vehicle 100 after the weighting factor $\alpha$ is finalized as above, the controller 240 can use the position of both eyes of the subject 130 to dynamically correct the display image to be displayed by the display 200. Specifically, the controller 240 can generate the third correction information based on the first correction information and the second correction information corresponding to the position of both eyes of the subject 130 and the finalized weighting factor $\alpha$. The controller 240 can dynamically correct the display image displayed on the display 200 using the first correction information and the second correction information. The controller 240 corrects the parallax barrier 210 based on the determined third correction information. The display image may include any information or image. For example, the display image may include a driving support image with the travel speed of the vehicle 100, the predicted route, the speed limit of the road being traveled, sign information, a route guide, or the like; an image indicating obstacles such as pedestrians; or another such image.

The weighting factor $\alpha$ that allows the subject 130 to perceive the least amount of distortion in the virtual image 140 differs depending on the video composition ratio of the dominant eye and the non-dominant eye of the subject 130. By changing the weighting factor $\alpha$ while viewing the virtual image 140 of the reference image with both eyes, for example, the subject 130 can cause the weighting factor $\alpha$ that produces the least distortion of the virtual image 140 to be stored in the memory 230. This configuration allows the display image to be corrected using a weighting factor $\alpha$ that takes into consideration the dominant eye of the subject 130. The distortion of the virtual image 140 perceived by the subject 130 is therefore reduced, improving visibility of the virtual image 140. This improves the convenience of a technique for making the virtual image 140 visible to the subject 130.

The controller 240 can correct the right eye image based on the first correction information. The controller 240 causes the subpixels forming the right subpixel groups Pgr to display the corrected right eye image. The controller 240 can correct the left eye image based on the second correction information. The controller 240 can cause the subpixels forming the left subpixel groups Pgl to display the corrected left eye image.

The controller 240 can correct the parallax barrier 210 based on the third correction information. Specifically, based on the third correction information, the controller 240 can control the liquid crystal shutter forming the parallax barrier 210. In greater detail, the controller 240 can control the liquid crystal shutter so as to change the portions forming the light-blocking surfaces 210a of the parallax barrier 210.

Figure 12:
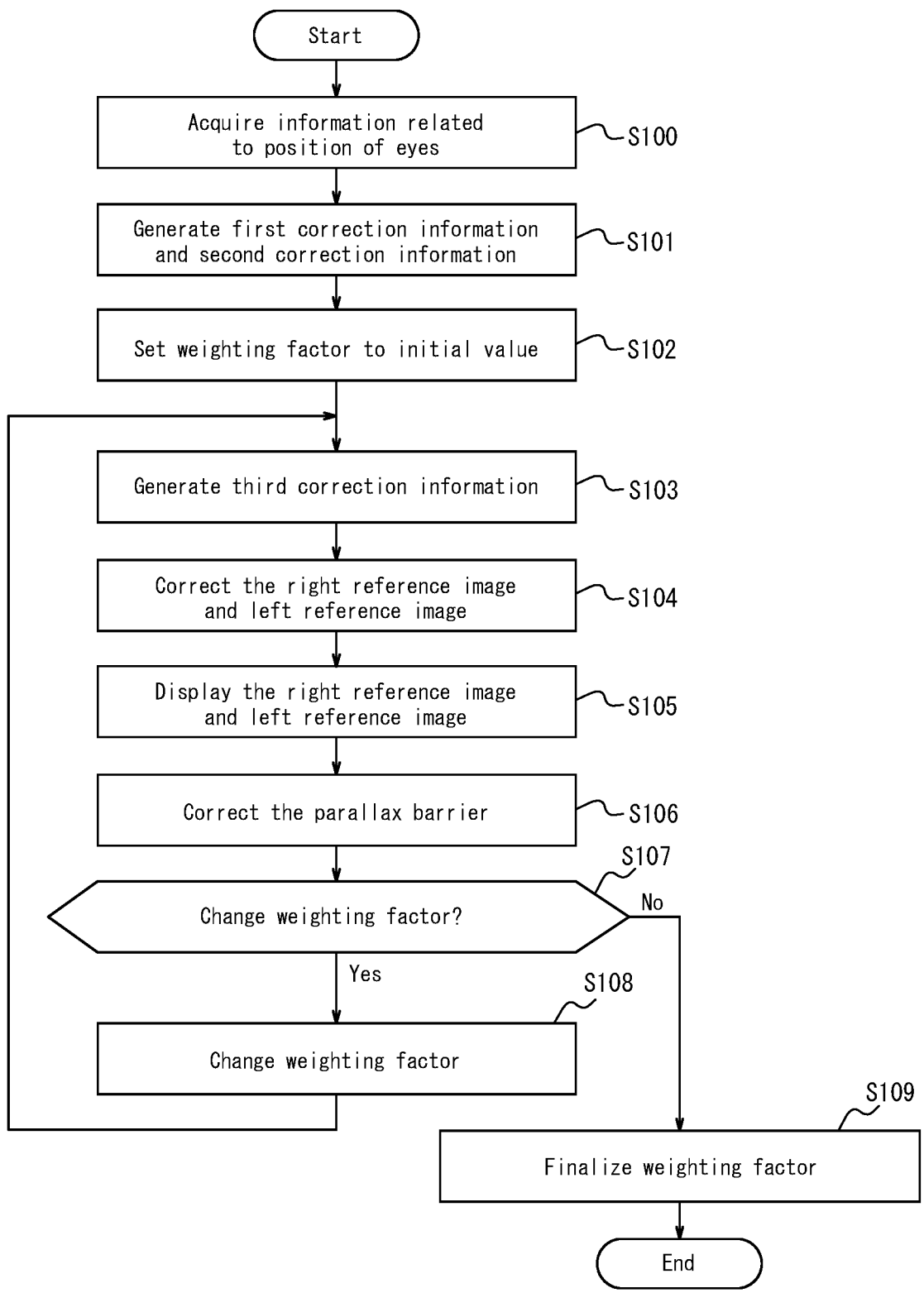
FIG. 12 is a flowchart illustrating an example of the processing flow for the three-dimensional display apparatus illustrated in FIG. 3 to determine a weighting factor.

Operations of the three-dimensional projection apparatus 120 to determine the above-described weighting factor $\alpha$ are described with reference to the flowchart in FIG. 12. These operations may be performed before the subject 130 drives the vehicle 100, for example.

Step S100: the controller 240 acquires information related to the position of the eyes of the subject 130 from the detection apparatus 110 through the communication interface 220.

Step S101: the controller 240 determines the first correction information corresponding to the position of the right eye and the second correction information corresponding to the position of the left eye of the subject 130.

Step S102: the controller 240 sets the weighting factor $\alpha$ to an initial value.

Step S103: the controller 240 generates the third correction information based on the first correction information, the second correction information, and the weighting factor α.

Step S104: the controller 240 corrects the right reference image based on the first correction information. The controller 240 corrects the left reference image based on the second correction information.

Step S105: the controller 240 causes the subpixels forming the right subpixel groups Pgr to display the corrected right reference image. The controller 240 causes the subpixels forming the left subpixel groups Pgl to display the corrected left reference image.

Step S106: the controller 240 corrects the parallax barrier 210 based on the third correction information.

Step S107: upon detecting operation by the subject 130, for example, the controller 240 determines whether to change the weighting factor α. When the controller 240 determines to change the weighting factor α (step S107: Yes), the process proceeds to step S108. Conversely, when the controller 240 determines not to change the weighting factor α (step S107: No), the process proceeds to step S109.

Step S108: the controller 240 changes the weighting factor α in accordance with the operation in step S107, for example. Subsequently, the process returns to step S103.

Step S109: the controller 240 finalizes the weighting factor α in accordance with the operation in step S107, for example, and stores the weighting factor α in the memory 230. The process then terminates.

Figure 13:
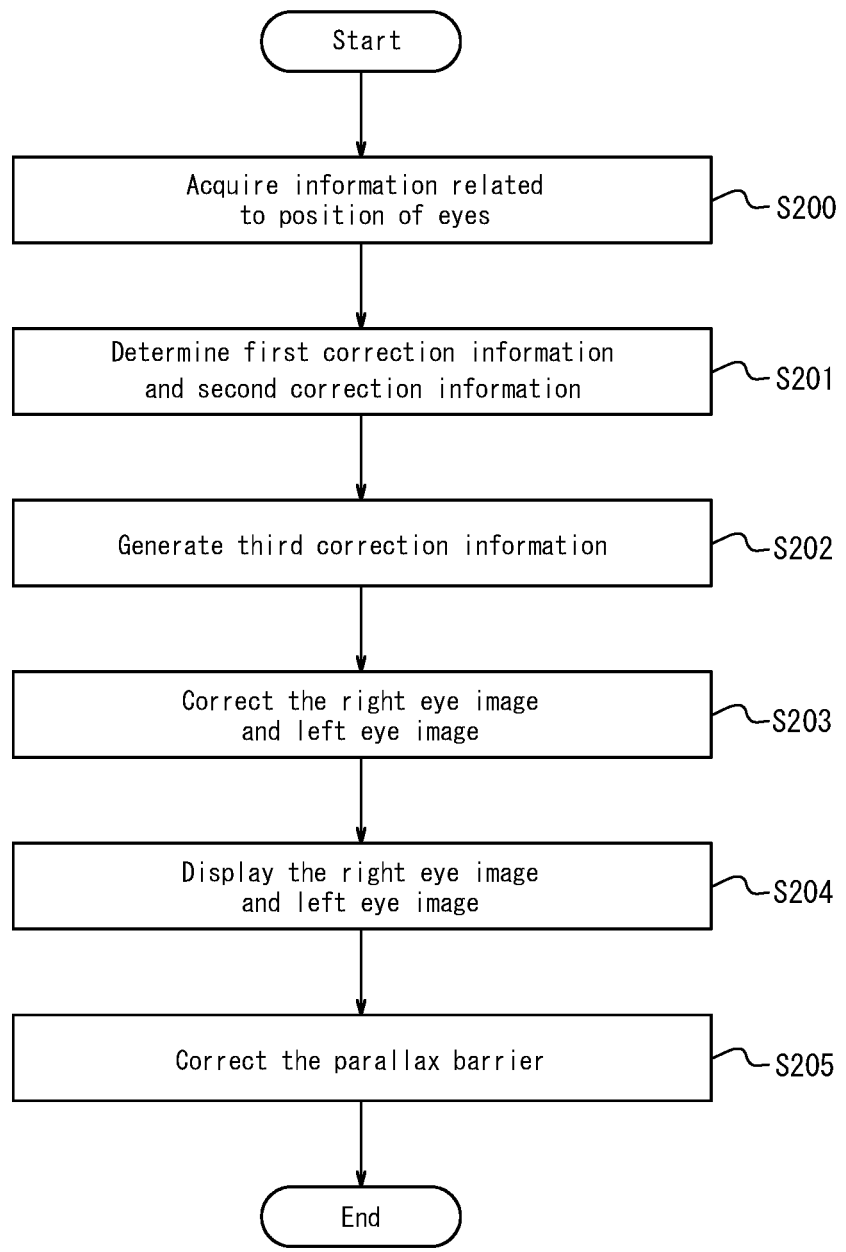
FIG. 13 is a flowchart illustrating an example of the processing flow for the three-dimensional display apparatus illustrated in FIG. 3 to project a three-dimensional image.

Operations of the three-dimensional projection apparatus 120 for dynamically correcting the display image in accordance with the position of both eyes of the subject 130 are now described with reference to FIG. 13 for a configuration adopting the above-described first algorithm. These operations may be repeatedly performed while the subject 130 is driving the vehicle 100, for example.

Step S200: the controller 240 acquires information related to the position of the eyes of the subject 130 from the detection apparatus 110 through the communication interface 220.

Step S201: the controller 240 determines the first correction information corresponding to the position of the right eye and the second correction information corresponding to the position of the left eye of the subject 130.

Step S202: the controller 240 generates the third correction information based on the first correction information, the second correction information, and the weighting factor α that is stored in the memory 23.

Step S203: the controller 240 corrects the right eye image based on the first correction information and corrects the left eye image based on the second correction information.

Step S204: the controller 240 causes the subpixels forming the left subpixel groups Pgl to display the corrected left eye image and causes the subpixels forming the right subpixel groups Pgr to display the corrected right eye image.

Step S205: the controller 240 corrects the parallax barrier 210 based on the third correction information. The process then terminates.

In accordance with the position of the eyes of the subject 130, the three-dimensional projection apparatus 120 of the present embodiments thus corrects the parallax barrier 210 and the image that the display surface 2010 is caused to display. The distortion, corresponding to the position of the eyes of the subject 130, that may occur in the first virtual image 140a and the second virtual image 140b due to the shape of the vehicle 100 is therefore corrected. Accordingly, the subject 130 can see the virtual image 140 of a three-dimensional image with reduced distortion.

The three-dimensional projection apparatus 120 of the present embodiments corrects the right eye image based on the first correction information corresponding to the position of the right eye and corrects the left eye image based on the second correction information corresponding to the position of the left eye. The subject 130 can therefore see images, corresponding to the position of the eyes, that have reduced distortion. Accordingly, the subject 130 can see the virtual image 140 of a three-dimensional image with reduced distortion.

The three-dimensional projection apparatus 120 according to the present embodiments corrects the parallax barrier 210 based on the third correction information generated using the first correction information, the second correction information, and the weighting factor α. The parallax barrier 210 seen by both eyes of the user is corrected based on the positions of the right eye and the left eye. The right eye image and left eye image with reduced distortion are therefore each blocked or transmitted by the parallax barrier 210, which has reduced distortion. Accordingly, the right eye of the subject 130 can see a right eye image with reduced distortion. The left eye can see a left eye image with reduced distortion.

The three-dimensional projection apparatus 120 according to the present embodiments determines the weighting factor α based on the dominant eye of the subject 130. Images are therefore corrected using a weighting factor α that takes into consideration the dominant eye of the subject 130. Accordingly, the distortion of the virtual image 140 perceived by the subject 130 is reduced, improving visibility of the virtual image 140.

Third Embodiments

Third embodiments of the present disclosure is described. Demand exists for increasing the convenience of techniques for making a virtual image visible to a subject. The present disclosure relates to an image projection apparatus, an image display apparatus, and a vehicle that increase the convenience of a technique for making a virtual image visible to a subject. An image projection apparatus, an image display apparatus, and a vehicle according to the present disclosure increase the convenience of a technique for making a virtual image visible to a subject.

Vehicle

Figure 14:
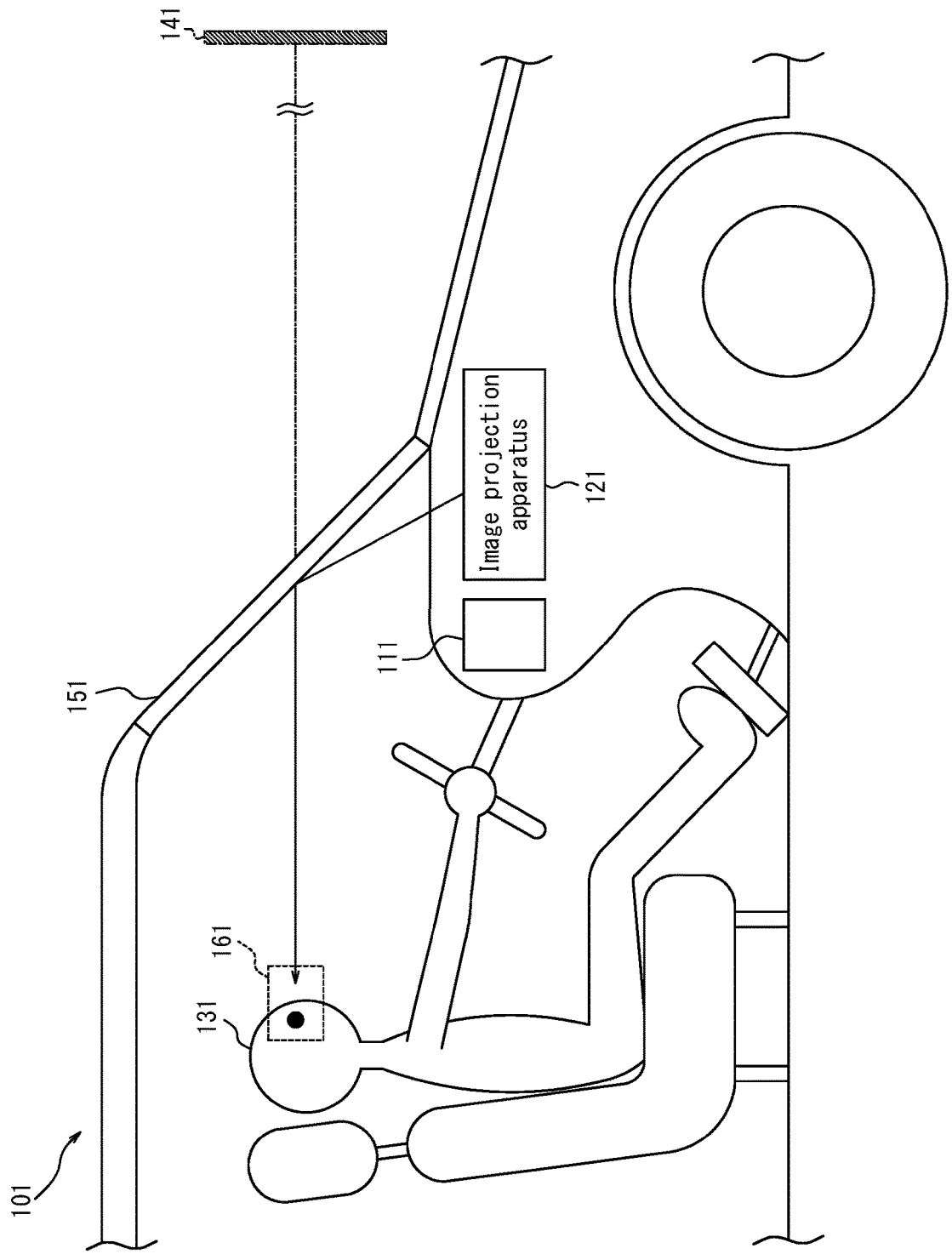
FIG. 14 illustrates a vehicle and an image projection apparatus according to third embodiments of the present disclosure.

A vehicle 101 according to the present embodiments is now described with reference to FIG. 14. The vehicle 101 includes an imaging apparatus 111 and an image projection apparatus 121.

The imaging apparatus 111 may, for example, include a CCD image sensor or a CMOS image sensor. The imaging apparatus 111 can capture a facial image of a subject 131. The imaging range of the imaging apparatus 111 includes at least an eye box 161, described below. The subject 131 may, for example, be the driver of the vehicle 101. The imaging apparatus 111 may be at any position inside or outside of the vehicle 101. For example, the imaging apparatus 111 is located in the dashboard of the vehicle 101. The imaging apparatus 111 can generate a captured image and output the captured image to an external apparatus. The captured image may, for example, be outputted in a wired or wireless manner, over a CAN, or the like.

The image projection apparatus 121 can form at least a part of a head-up display that makes a virtual image 141 of a required image visible to the subject 131. The image projection apparatus 121 may be at any position inside or outside of the vehicle 101. For example, the image projection apparatus 121 is located in the dashboard of the vehicle 101. The image projection apparatus 121 projects an image onto a first optical member 151 provided in the vehicle 101. Specifically, the image projection apparatus 121 may emit image projection light towards a predetermined region of the first optical member 151. Details of the image projection light are provided below. The first optical member 151 may include a windshield, a combiner, or the like. When the image projection apparatus 121 includes the first optical member 151, the image projection apparatus 121 can form a head-up display.

Image projection light reflected by the predetermined region of the first optical member 151 reaches the eye box 161. The eye box 161 is a region in actual space in which it is assumed that the eyes of the subject 131 can be located, taking into consideration the physique, posture, change in posture, and the like of the subject 131, for example. The eye box 161 may have any shape. The eye box 161 may include a flat or three-dimensional region. The solid arrow in FIG. 14 indicates the path over which a portion of the image projection light emitted from the image projection apparatus 121 reaches the eye box 161. The path traveled by light is also referred to as the optical path. At least one of an optical element that transmits light and an optical element that reflects light may be included along the optical path. When the eyes of the subject 131 are inside the eye box 161 and image projection light reaches the eye box 161, the subject 131 can see a virtual image 141 of the image. The virtual image 141 can be visible in front of the vehicle 101, for example.

Image Projection Apparatus

Figure 15:
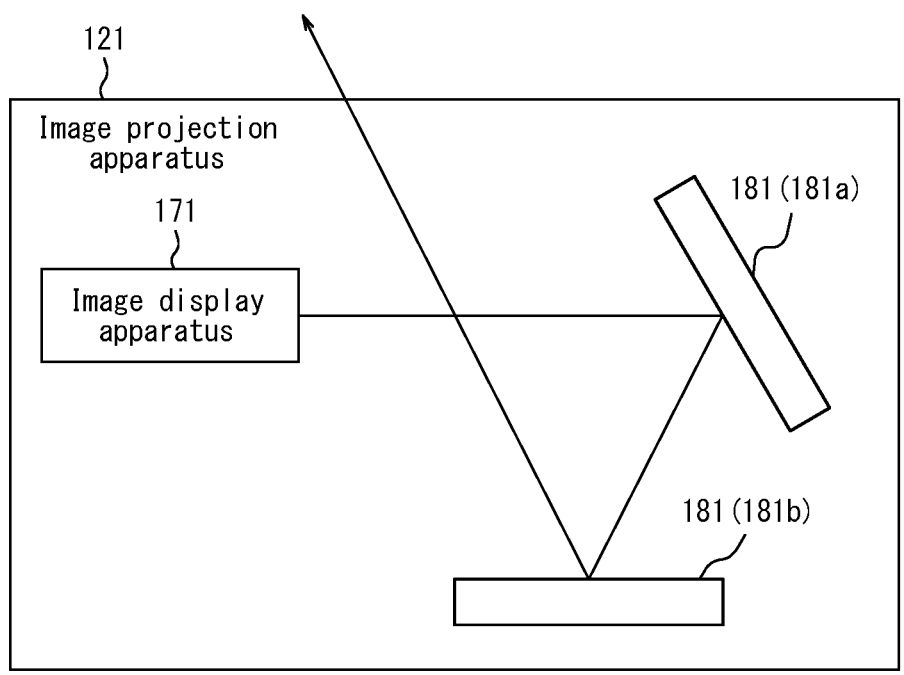
FIG. 15 is a block diagram illustrating the schematic configuration of the image projection apparatus of FIG. 14.

The image projection apparatus 121 is described in detail with reference to FIG. 15. The image projection apparatus 121 includes an image display apparatus 171 and one or more second optical members 181. FIG. 15 illustrates an example configuration in which the image projection apparatus 121 includes two second optical members 181a, 181b. FIG. 15 schematically illustrates an example configuration of the image projection apparatus 121. For example, the size, shape, arrangement, and the like of the image projection apparatus 121 and the constituent elements of the image projection apparatus 121 are not limited to the example in FIG. 15.

The image display apparatus 171 may be capable of displaying any images. The image display apparatus 171 emits image projection light inside the image projection apparatus 121. The image projection light may include light that projects the image displayed by the image display apparatus 171. The detailed configuration of the image display apparatus 171 is described below.

The second optical member 181 projects the image displayed by the image display apparatus 171 onto the first optical member 151 to make a virtual image 141 of the image visible to the subject 131. Specifically, the second optical member 181 causes the image projection light emitted from the image display apparatus 171 to reach the outside of the image projection apparatus 121. In the example in FIG. 15, the second optical members 181a, 181b cause the image projection light emitted from the image display apparatus 171 to reach the outside of the image projection apparatus 121. The second optical member 181 may include a lens or a mirror. For example, the second optical members 181a, 181b may each include a mirror. At least one of the second optical members 181a, 181b may include a lens. One of the second optical members 181a, 181b may be a mirror and the other a lens. The solid arrow in FIG. 15 indicates the path over which a portion of the image projection light emitted from the image display apparatus 171 is reflected by the second optical members 181a, 181b, passes through a window provided in the housing of the image projection apparatus 121, and reaches the outside of the image projection apparatus 121. The image projection light that reaches the outside of the image projection apparatus 121 reaches a predetermined region of the first optical member 151 included in the vehicle 101, as illustrated in FIG. 14.

The second optical member 181 may function as a magnifying optical system that magnifies the image displayed by the image display apparatus 171. For example, at least one of the second optical members 181a, 181b may be a mirror having a convex shape or a concave shape in at least a portion of the surface that the image projection light reaches. At least one of the second optical members 181a, 181b may be a lens having a convex shape or a concave shape in at least a portion of the entrance surface or exit surface of the image projection light. At least a portion of the convex shape and the concave shape may be spherical or aspherical.

Image Display Apparatus

Figure 16:
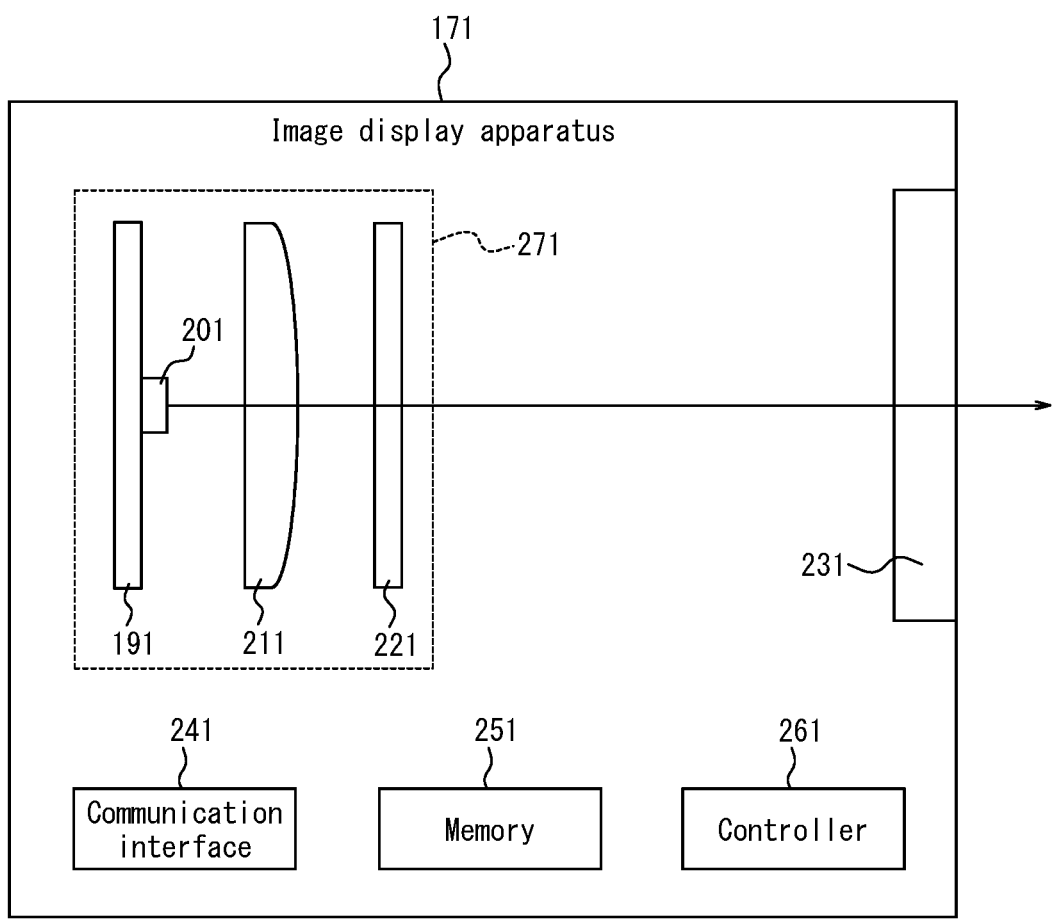
FIG. 16 is a block diagram illustrating the schematic configuration of an image display apparatus of FIG. 15.

The image display apparatus 171 is described in detail with reference to FIG. 16. The image display apparatus 171 includes a substrate 191, a light source element 201, a third optical member 211, a fourth optical member 221, a display 231, a communication interface 241, a memory 251, and a controller 261. The substrate 191, the light source element 201, the third optical member 211, and the fourth optical member 221 may be configured as one light source apparatus 271. In this case, the image display apparatus 171 includes the light source apparatus 271, the display 231, the communication interface 241, the memory 251, and the controller 261. The substrate 191, the light source element 201, the third optical member 211, the fourth optical member 221, the display 231, the communication interface 241, the memory 251, and the controller 261 may be fixed inside the image display apparatus 171. The light source element 201 may be disposed on the substrate 191. FIG. 16 schematically illustrates an example configuration of the image display apparatus 171. For example, the size, shape, arrangement, and the like of the image display apparatus 171 and the constituent elements of the image display apparatus 171 are not limited to the example in FIG. 16.

The light source element 201 may, for example, include one or more LEDs, one or more laser apparatuses, or the like. The light source element 201 emits light in accordance with control by the controller 261. The solid arrow extending from the light source element 201 in FIG. 16 indicates the path over which a portion of light emitted from the light source element 201 travels. This portion of light emitted from the light source element 201 is also simply referred to below as light from the light source element 201.

With respect to the position of the light source element 201, the third optical member 211 is positioned in the travel direction of light from the light source element 201. In the example in FIG. 16, the third optical member 211 is positioned to the right of the light source element 201. The third optical member 211 includes a collimator lens, for example. The third optical member 211 collimates light incident from the light source element 201. The collimated light may be light traveling in a direction substantially parallel to the optical axis direction of the third optical member 211.

With respect to the position of the third optical member 211, the fourth optical member 221 is positioned in the travel direction of light from the light source element 201. In the example in FIG. 16, the fourth optical member 221 is positioned to the right of the third optical member 211. The fourth optical member 221 includes a lens, for example. The fourth optical member 221 may include a Fresnel lens, for example. The fourth optical member 221 may be fixed inside the image display apparatus 171 so that the optical axis of the fourth optical member 221 and the optical axis of the third optical member 211 are substantially matched. The optical axis of the third optical member 211 or the optical axis of the fourth optical member 221 are also referred to as the optical axis of the image display apparatus 171 or the optical axis of the light source apparatus 271. The direction of travel of image projection light emitted from the image display apparatus 171 and the optical axis direction of the image display apparatus 171 may be substantially parallel. The fourth optical member 221 may refract, in a requested direction of travel, at least a portion of light that passes through and is collimated by the third optical member 211.

The display 231 may, for example, include a transmission-type liquid crystal device such as an LCD, a micro electro mechanical systems (MEMS) shutter display, or the like. With respect to the position of the fourth optical member 221, the display 231 is positioned in the travel direction of light from the light source element 201. In the example in FIG. 16, the display 231 is positioned to the right of the fourth optical member 221. In an embodiment, the light source element 201, the third optical member 211, the fourth optical member 221, and the display 231 may be disposed along the optical axis of the image display apparatus 171 in this order, as illustrated in FIG. 16, for example. The light emitted from the display 231 is also referred to as image projection light below.

The communication interface 241 may include an interface capable of communicating with an external apparatus. The external apparatus may, for example, include an imaging apparatus 111.

The memory 251 may include a temporary memory device and a secondary memory device. The memory 251 may, for example, be configured using a semiconductor memory, a magnetic memory, an optical memory, or the like. The memory 251 stores various information and programs necessary for operation of the image display apparatus 171.

For example, the memory 251 may store a plurality of pieces of correction information corresponding to a plurality of positions in actual space. The plurality of positions are also referred to below as reference positions. Details of the correction information are provided below. FIG. 17 illustrates n pieces of correction information P1-Pn corresponding to n reference positions in actual space. The n reference positions may be indicated as 3D orthogonal coordinates or 3D polar coordinates with an arbitrary position in the vehicle 101 as the origin. The reference positions in actual space corresponding to the pieces of correction information may exist inside or outside of the eye box 161. For example, when the eye box 161 is a hexahedron, the plurality of reference positions may include the positions of the eight vertices of the hexahedron. The plurality of reference positions may include the positions of the eight vertices of a first hexahedron that is larger than the eye box 161 and includes the eye box 161. The plurality of reference positions may include the positions of the eight vertices of a second hexahedron that is smaller than the eye box 161 and is included in the eye box 161. A plurality of second hexahedrons may be included inside the eye box 161. The plurality of reference positions may include any position within, or on the sides of, the first hexahedron or the second hexahedron. In an example, the memory 251 may store a plurality of pieces of correction information corresponding to a plurality of reference positions located inside the eye box 161.

The correction information is now described in detail. As described above, the subject 131 can see a virtual image 141 of an image displayed by the display 231 as a result of image projection light being reflected by the first optical member 151 and reaching the eye box 161. The surface shape of the first optical member 151 may, for example, be designed in accordance with the vehicle 101 to which the first optical member 151 is attached and need not be flat. Furthermore, when the first optical member 151 is attached to the vehicle 101, a bending, twisting, or other such force is applied to the first optical member 151 due to the rigidity of the vehicle 101, which may cause the first optical member 151 to be distorted. Therefore, the shape of the virtual image 141 seen by the subject 131 may be distorted depending on the position of the eyes of the subject 131 that sees the virtual image 141.

The correction information is used to correct distortion of the shape of the virtual image 141 in accordance with the position of the eyes of the subject 131. The correction information may include information to change the shape of the image displayed by the display 231 so as to reduce distortion of the shape of the virtual image 141. For example, the correction information may include information indicating a shift amount of each of a plurality of feature points on the image displayed by the display 231. The arrangement of the plurality of feature points on the image may be determined freely. For example, the plurality of feature points may be arranged in a grid with freely chosen intervals. The plurality of feature points may correspond to a plurality of pixels displaying the image. Correction based on the correction information allows the image displayed by the display 231 to be deformed so that, for example, the feature points on the image are respectively moved by the shift amounts indicated in the correction information. For example, the image to be displayed by the display 231 can be deformed evenly or unevenly by correction using the correction information and then displayed by the display 231. The image projection light of the image deformed based on the correction information allows the subject 131 to see a virtual image 141 with reduced distortion. The correction information can be determined by experiment or simulation, for example.

The controller 261 includes one or more processors. The term "processor" encompasses general-purpose processors that execute particular functions by reading particular programs and dedicated processors that are specialized for particular processing. The controller 261 may be either an SoC or an SiP with one processor or a plurality of processors that work together.

The controller 261 controls overall operations of the light source apparatus 271. For example, the controller 261 controls the drive power of the light source element 201 to cause the light source element 201 to emit light. The controller 261 causes the display 231 to display an image. The image may include characters or graphics.

The controller 261 acquires a captured image of the subject 131 from the imaging apparatus 111 via the communication interface 241. The controller 261 detects the position of both eyes of the subject 131 in actual space based on the acquired captured image. Any algorithm using the captured image may be adopted to detect the position of both eyes of the subject 131 in actual space. For example, the memory 251 stores correspondence information in advance. The correspondence information associates a combination of the position of the face of the subject 131, the orientation of the face, and the size of the face in the captured image with the position of both eyes of the subject 131 in actual space. The correspondence information can be determined by experiment or simulation, for example. The correspondence information may be stored as a lookup table, for example. The controller 261 detects the position of the face of the subject 131, the orientation of the face, and the size of the face in the captured image. A method using pattern matching or a method to extract feature points of the subject 131 in the captured image, for example, may be adopted to detect the face and eyes. From the correspondence information, the controller 261 extracts the position of both eyes of the subject 131 in actual space corresponding to the combination of the position of the face of the subject 131, the orientation of the face, and the size of the face detected in the captured image. The controller 261 detects the extracted positions as the position of both eyes of the subject 131 in actual space.

The controller 261 dynamically corrects the image displayed by the display 231 in accordance with the detected position of both eyes. The correction of the image may, for example, include deformation of the image. Any algorithm to correct the image may be adopted. Two different algorithms are described below in detail.

First Algorithm

Overall, the first algorithm generates third correction information based on first correction information corresponding to the position of the right eye of the subject 131 and second correction information corresponding to the position of the left eye of the subject 131. The display image displayed by the display 231 is dynamically corrected based on the generated third correction information. Details are provided below.

The controller 261 determines the first correction information corresponding to the position of the right eye of the subject 131. For example, the controller 261 may determine the first correction information corresponding to the position of the right eye of the subject 131 by selection from among a plurality of pieces of correction information stored in the memory 251. Alternatively, the controller 261 may determine the first correction information corresponding to the position of the right eye of the subject 131 by generating the first correction information based on two or more pieces of correction information. Any algorithm to generate the first correction information may be adopted.

In the example in FIG. 18, the right eye R of the subject 131 is positioned inside a hexahedron that has eight reference positions as vertices, correction information being associated with each reference position. In this case, the controller 261 generates the first correction information corresponding to the position of the right eye R by interpolation based on two or more pieces of correction information among the eight pieces of correction information located near the right eye R.

In the example in FIG. 19, the right eye R of the subject 131 is positioned outside a hexahedron that has eight reference positions as vertices, correction information being associated with each reference position. In this case, the controller 261 generates the first correction information corresponding to the position of the right eye R by extrapolation based on two or more pieces of correction information among the eight pieces of correction information located near the right eye R.

The first correction information is generated by interpolation or extrapolation in this configuration. This can reduce the number of reference positions for which correction information needs to be stored and can reduce the volume of the correction information that needs to be stored in the memory 251.

The controller 261 determines the second correction information corresponding to the position of the left eye of the subject 131. For example, the controller 261 may determine the second correction information corresponding to the position of the left eye of the subject 131 by selection from among a plurality of pieces of correction information stored in the memory 251. Alternatively, the controller 261 may determine the second correction information corresponding to the position of the left eye of the subject 131 by generating the second correction information based on two or more pieces of correction information. The second correction information may be generated in the same way as the above-described generation of the first correction information. When the left eye L of the subject 131 is positioned inside a hexahedron, as illustrated in the example in FIG. 18, the controller 261 generates the second correction information corresponding to the position of the left eye L by interpolation. When the left eye L of the subject 131 is positioned outside a hexahedron, as illustrated in the example in FIG. 19, the controller 261 generates the second correction information corresponding to the position of the left eye L by extrapolation.

The controller 261 generates third correction information based on the first correction information and the second correction information. Any algorithm to generate the third correction information may be adopted. For example, the controller 261 generates the third correction information by weighting each of the first correction information and the second correction information. Specifically, a shift amount S3, indicated by the third correction information, of a feature point on the image is determined by the above-described Equation (1).

The weighting factor $\alpha$ may be freely determined in a range of 0 or more and 1 or less. For example, the weighting factor $\alpha$ may be determined in advance. Alternatively, the weighting factor $\alpha$ may be determined taking into consideration the dominant eye of the subject 131.

The determination of the weighting factor $\alpha$ that takes into consideration the dominant eye of the subject 131 may, for example, be made before the subject 131 drives the vehicle 101. Specifically, the controller 261 acquires a captured image of the subject 131. The controller 261 detects the position of both eyes of the subject 131 in actual space. The controller 261 determines the first correction information and the second correction information based on the detected position of both eyes. The controller 261 sets the weighting factor $\alpha$ to an initial value. The controller 261 generates the third correction information based on the first correction information, the second correction information, and the weighting factor $\alpha$. The controller 261 causes the display 231 to display a reference image corrected using the generated third correction information. Any image may be adopted as the reference image. For example, the reference image may include a square, circle, a plurality of lines arranged in a grid, or the like.

The controller 261 changes the weighting factor $\alpha$ in accordance with user operation by the subject 131, for example. When the weighting factor $\alpha$ is changed, the controller 261 newly generates the third correction information based on the first correction information, the second correction information, and the changed weighting factor $\alpha$. The controller 261 causes the display 231 to display a reference image corrected using the newly generated third correction information. The weighting factor $\alpha$ may be changed, and the reference image that is corrected using the newly generated third correction information may be displayed, a plurality of times in accordance with user operation. The controller 261 finalizes the weighting factor α and stores the weighting factor α in the memory 251 in accordance with user operation by the subject 131, for example.

When, for example, the subject 131 drives the vehicle 101 after the weighting factor α is finalized as above, the controller 261 uses the position of both eyes of the subject 131 to dynamically correct the display image that the display 231 is caused to display. Specifically, the controller 261 determines the third correction information based on the first correction information and the second correction information corresponding to the position of both eyes of the subject 131 and the finalized weighting factor α. The controller 261 dynamically corrects the display image displayed on the display 231 using the determined third correction information. The display image may include any information or image. For example, the display image may include a driving support image with the travel speed of the vehicle 101, the predicted route, the speed limit of the road being traveled, sign information, a route guide, or the like; an image indicating obstacles such as pedestrians; or another such image.

The weighting factor α that allows the subject 131 to perceive the least amount of distortion in the virtual image 141 differs depending on the video composition ratio of the dominant eye and the non-dominant eye of the subject 131. By changing the weighting factor α while viewing the virtual image 141 of the reference image with both eyes, for example, the subject 131 can cause the weighting factor α that produces the least distortion of the virtual image 141 to be stored in the memory 251. This configuration allows the display image to be corrected using a weighting factor α that takes into consideration the dominant eye of the subject 131. The distortion of the virtual image 141 perceived by the subject 131 is therefore reduced, improving visibility of the virtual image 141. This improves the convenience of a technique for making the virtual image 141 visible to the subject 131.

Second Algorithm

Overall, the second algorithm determines a specific position based on the position of both eyes of the subject 131. Third correction information corresponding to the determined specific position is then determined. The display image displayed by the display 231 is dynamically corrected based on the determined third correction information. Details are provided below.

The controller 261 determines the position of both eyes of the subject 131. The controller 261 determines a specific position based on the position of both eyes of the subject 131. Any algorithm to determine the specific position may be adopted. For example, the controller 261 weights the position of the right eye and the position of the left eye of the subject 131 and determines the specific position. In greater detail, a specific position Q3 is determined by Equation (2) below.

$$Q3 = \alpha \times Q1 + (1-\alpha) \times Q2 \quad (2)$$

In Equation (2), α represents a weighting factor having a value of 0 or more and 1 or less. Q1 represents the position of the right eye of the subject 131. Q2 represents the position of the left eye of the subject 131. For example, when the weighting factor α is 0.3, the position Q1 of the right eye of the subject 131 is {10, 0, 0}, and the position Q2 of the left eye of the subject 131 is {20, 10, 0}, then the specific position Q3 is {17, 7, 0}.

The weighting factor α may be freely determined in a range of 0 or more and 1 or less. For example, the weighting factor α may be determined in advance. Alternatively, the weighting factor α may be determined taking into consideration the dominant eye of the subject 131. The determination of the weighting factor α that takes into consideration the dominant eye of the subject 131 may be made in the same way as in the first algorithm. Specifically, the controller 261 acquires a captured image of the subject 131. The controller 261 detects the position of both eyes of the subject 131 in actual space. The controller 261 sets the weighting factor α to an initial value. The controller 261 determines a specific position in accordance with the position of both eyes of the subject 131 and the weighting factor α. The controller 261 determines the third correction information corresponding to the specific position. The determination of the third correction information corresponding to the specific position may be made in the same way as the determination of the first correction information or the second correction information in the above-described first algorithm. The controller 261 causes the display 231 to display a reference image corrected using the determined third correction information.

The controller 261 changes the weighting factor α in accordance with user operation by the subject 131, for example. When the weighting factor α is changed, the controller 261 determines a new specific position based on the position of both eyes of the subject 131 and the changed weighting factor α. The controller 261 newly determines the third correction information corresponding to the newly determined specific position. The controller 261 causes the display 231 to display a reference image corrected using the newly determined third correction information. The weighting factor α may be changed, and the reference image that is corrected using the newly determined third correction information may be displayed, a plurality of times in accordance with user operation. The controller 261 finalizes the weighting factor α and stores the weighting factor α in the memory 251 in accordance with user operation by the subject 131, for example.

When, for example, the subject 131 drives the vehicle 101 after the weighting factor α is finalized as above, the controller 261 uses the position of both eyes of the subject 131 to dynamically correct the display image that the display 231 is caused to display. In greater detail, the controller 261 determines a specific position based on the position of both eyes of the subject 131 and the finalized weighting factor α. The controller 261 determines the third correction information corresponding to the specific position. The controller 261 dynamically corrects the display image displayed on the display 231 using the determined third correction information.

Like the first algorithm, the above-described second algorithm allows the display image to be corrected using a weighting factor α that takes into consideration the dominant eye of the subject 131. The distortion of the virtual image 141 perceived by the subject 131 is therefore reduced, improving visibility of the virtual image 141. This improves the convenience of a technique for making the virtual image 141 visible to the subject 131. With the second algorithm, it suffices to determine the third correction information corresponding to the specific position determined based on the position of both eyes of the subject 131 and the weighting factor α. Consequently, the processing load can be reduced as compared to the first algorithm, which generates the third correction information based on the first correction information, the second correction information, and the weighting factor α.

Figure 20:
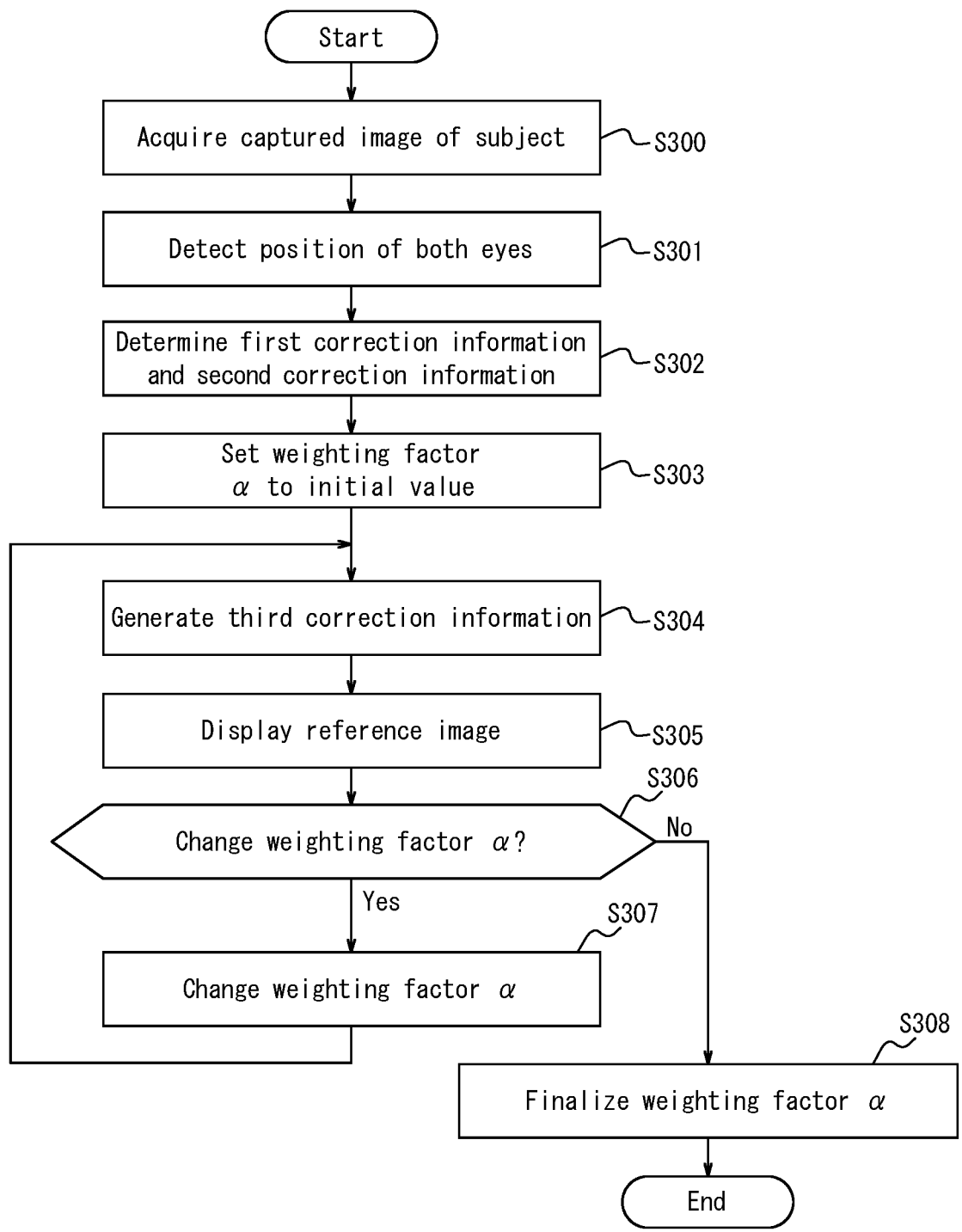
FIG. 20 is a flowchart illustrating first operations of an image projection apparatus.

Operations of the image projection apparatus 121 for determining the weighting factor α while taking into consideration the dominant eye of the subject 131 are now described with reference to FIG. 20 for a configuration adopting the above-described first algorithm. These operations may be performed before the subject 131 drives the vehicle 101, for example.

Step S300: the controller 261 acquires a captured image of the subject 131 from the imaging apparatus 111 via the communication interface 241.

Step S301: the controller 261 detects the position of both eyes of the subject 131 in actual space based on the acquired captured image.

Step S302: the controller 261 determines the first correction information corresponding to the position of the right eye and the second correction information corresponding to the position of the left eye of the subject 131.

Step S303: the controller 261 sets the weighting factor α to an initial value.

Step S304: the controller 261 generates the third correction information based on the first correction information, the second correction information, and the weighting factor α.

Step S305: the controller 261 causes the display 231 to display a reference image corrected using the third correction information.

Step S306: upon detecting user operation by the subject 131, for example, the controller 261 determines whether to change the weighting factor α. When the controller 261 determines to change the weighting factor α (step S306: Yes), the process proceeds to step S307. Conversely, when the controller 261 determines not to change the weighting factor α (step S306: No), the process proceeds to step S308.

Step S307: the controller 261 changes the weighting factor α in accordance with the user operation in step S306, for example. Subsequently, the process returns to step S304.

Step S308: the controller 261 finalizes the weighting factor α in accordance with the user operation in step S306, for example, and stores the weighting factor α in the memory 251. The process then terminates.

Figure 21:
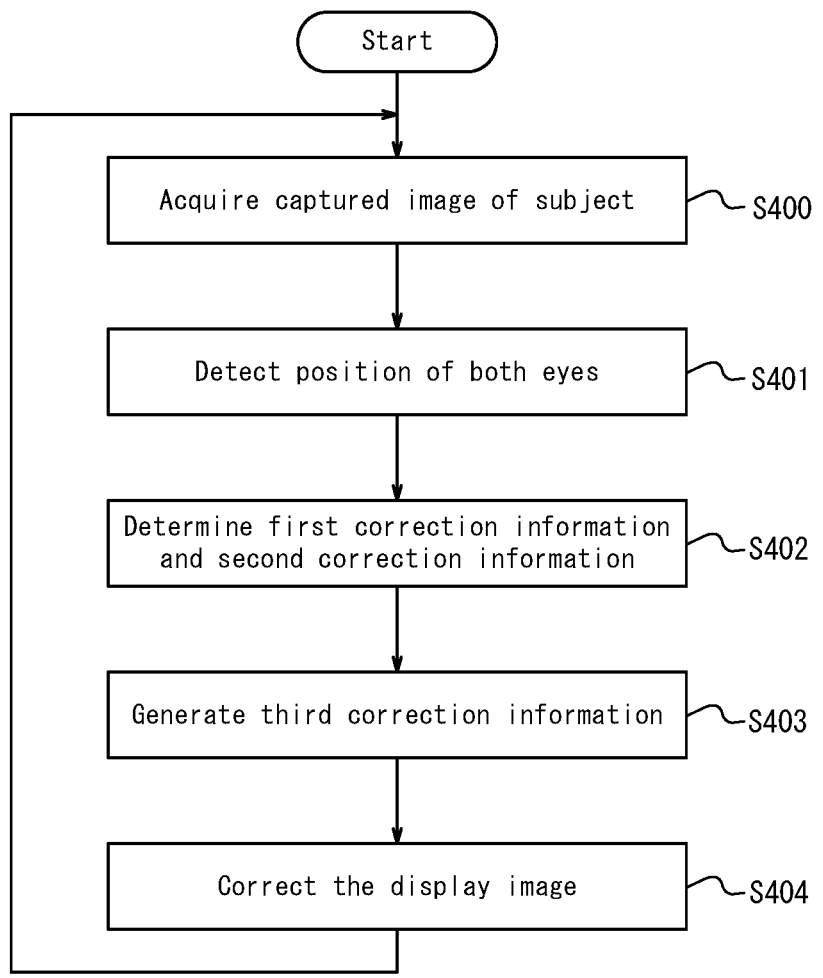
FIG. 21 is a flowchart illustrating second operations of an image projection apparatus.

Operations of the image projection apparatus 121 for dynamically correcting the display image in accordance with the position of both eyes of the subject 131 are now described with reference to FIG. 21 for a configuration adopting the above-described first algorithm. These operations may be repeatedly performed while the subject 131 is driving the vehicle 101, for example.

Step S400: the controller 261 acquires a captured image of the subject 131 from the imaging apparatus 111 via the communication interface 241.

Step S401: the controller 261 detects the position of both eyes of the subject 131 in actual space based on the acquired captured image.

Step S402: the controller 261 determines the first correction information corresponding to the position of the right eye and the second correction information corresponding to the position of the left eye of the subject 131.

Step S403: the controller 261 generates the third correction information based on the first correction information, the second correction information, and the weighting factor α that is stored in the memory 251.

Step S404: the controller 261 causes the display 231 to display the display image corrected using the third correction information. Subsequently, the process returns to step S400.

Operations of the image projection apparatus 121 for dynamically correcting the display image in accordance with the position of both eyes of the subject 131 are now described with reference to FIG. 22 for a configuration adopting the above-described second algorithm. These operations may be repeatedly performed while the subject 131 is driving the vehicle 101, for example.

Step S500: the controller 261 acquires a captured image of the subject 131 from the imaging apparatus 111 via the communication interface 241.

Step S501: the controller 261 detects the position of both eyes of the subject 131 in actual space based on the acquired captured image.

Step S502: the controller 261 determines a specific position based on the position of the right eye and the position of the left eye of the subject 131 and the weighting factor α that is stored in the memory 251.

Step S503: the controller 261 determines the third correction information corresponding to the determined specific position.

Step S504: the controller 261 causes the display 231 to display the display image corrected using the third correction information. Subsequently, the process returns to step S500.

In accordance with the position of both eyes of the subject 131, the image projection apparatus 121 according to an embodiment dynamically corrects the image that the display 231 is caused to display, as described above. This configuration reduces the distortion of the virtual image 141 perceived by the subject 131, thereby improving visibility of the virtual image 141. This improves the convenience of a technique for making the virtual image 141 visible to the subject 131.

The image projection apparatus 121 may store a plurality of pieces of correction information corresponding to a plurality of reference positions in actual space. The image projection apparatus 121 may determine first correction information corresponding to the position of the right eye of the subject 131 and second correction information corresponding to the position of the left eye of the subject 131 based on a stored plurality of pieces of correction information. The image projection apparatus 121 may store a weighting factor that is determined taking into consideration the dominant eye of the subject 131. The image projection apparatus 121 may generate the third correction information based on the first correction information, the second correction information, and the weighting factor. The image projection apparatus 121 may use the third correction information to correct the image that the display 231 is caused to display. This configuration accurately reduces the distortion of the virtual image 141 perceived by the subject 131, thereby further improving visibility of the virtual image 141.

The image projection apparatus 121 may determine the specific position based on the position of the right eye of the subject 131, the position of the left eye of the subject 131, and the weighting factor that is determined taking into consideration the dominant eye of the subject 131. The image projection apparatus 121 may determine the third correction information corresponding to the specific position based on a plurality of pieces of correction information stored in the memory 251. The image projection apparatus 121 may use the third correction information to correct the image that the display 231 is caused to display. This configuration accurately reduces the distortion of the virtual image 141 perceived by the subject 131, thereby further improving visibility of the virtual image 141.

The present disclosure is based on drawings and embodiments, but it should be noted that a person of ordinary skill in the art could easily make a variety of modifications and adjustments based on the present disclosure. Therefore, such changes and modifications are to be understood as included within the scope of the present disclosure. For example, the functions and the like included in the various means and steps may be reordered in any logically consistent way. Furthermore, means and steps may be combined into one or divided.

For example, the first illumination optical system 25 and the second illumination optical system 26 are separate in the first embodiments but may instead be configured using different regions of the same optical element.

For example, in the configuration described in the second embodiments, correction information including information indicating the shift amount of each of a plurality of feature points on an image displayed by the display 200 is used to deform the image, thereby correcting the image. The content of the correction information and the processing to correct images are not, however, limited to the above-described configuration.

For example, the controller 240 may project the image for the display 200 to display onto a polygon as a texture image. Any algorithm to project a texture image onto a polygon may be adopted. For example, a texture image may be projected onto a polygon using mapping information indicating the correspondence relationship between texture coordinates on the texture image and the vertices of the polygon. The shape of the polygon may be determined freely. The mapping information may be determined freely. The controller 240 arranges the polygon with the texture image projected thereon within three-dimensional virtual space, for example. The controller 240 causes the display 200 to display an image of a region, located within the virtual space that includes the polygon, as viewed from the perspective of a virtual camera. Like the second embodiments, this configuration allows the subject 130 to see the virtual image 140 of the image that the display 200 is caused to display.

In the above-described configuration using a polygon, the correction information may include information for changing the mapping information to reduce distortion of the shape of the virtual image 140. For example, the correction information may include information for changing the vertices of the polygon that correspond to texture coordinates on the texture image to other vertices. For example, the texture image projected onto the polygon can be deformed evenly or unevenly by correction using the correction information and then displayed by the display 200. The image light of the texture image deformed based on the correction information allows the subject 130 to see a virtual image 140 with reduced distortion, as in the second embodiments. The processing to change the mapping information can be executed at high speed when, for example, the controller 240 includes dedicated hardware. The dedicated hardware may, for example, include a graphics accelerator. This configuration allows high-speed correction of the image that the display 200 is caused to display. Therefore, when the position of both eyes of the subject 130 changes, for example, the distortion of the virtual image 140 due to the change in the position of both eyes can be reduced at high speed. This further improves the convenience of a technique for making the virtual image 140 visible to the subject 130.

In the above-described configuration using a polygon, the correction information may include information for changing the shape of the polygon to reduce distortion of the shape of the virtual image 140. For example, the texture image projected onto the polygon can be deformed evenly or unevenly by correction using the correction information and then displayed by the display 200. The image light of the texture image deformed based on the correction information allows the subject 130 to see a virtual image 140 with reduced distortion, as in the second embodiments. The processing to change the shape of the polygon can be executed at high speed when, for example, the controller 240 includes dedicated hardware. The dedicated hardware may, for example, include a graphics accelerator. This configuration allows high-speed correction of the image that the display 200 is caused to display. Therefore, when the position of both eyes of the subject 130 changes, for example, the distortion of the virtual image 140 due to the change in the position of both eyes can be reduced at high speed. This further improves the convenience of a technique for making the virtual image 140 visible to the subject 130.

For example, in the configuration described in the third embodiments, correction information including information indicating the shift amount of each of a plurality of feature points on an image displayed by the display 231 is used to deform the image, thereby correcting the image. The content of the correction information and the processing to correct images are not, however, limited to the above-described configuration.

For example, the controller 261 may project the image for the display 231 to display onto a polygon as a texture image. Any algorithm to project a texture image onto a polygon may be adopted. For example, a texture image may be projected onto a polygon using mapping information indicating the correspondence relationship between texture coordinates on the texture image and the vertices of the polygon. The shape of the polygon may be determined freely. The mapping information may be determined freely. The controller 261 arranges the polygon with the texture image projected thereon within three-dimensional virtual space, for example. The controller 261 causes the display 231 to display an image of a region, located within the virtual space that includes the polygon, as viewed from the perspective of a virtual camera. Like the third embodiments, this configuration allows the subject 131 to see the virtual image 141 of the image that the display 231 is caused to display.

In the above-described configuration using a polygon, the correction information may include information for changing the mapping information to reduce distortion of the shape of the virtual image 141. For example, the correction information may include information for changing the vertices of the polygon that correspond to texture coordinates on the texture image to other vertices. For example, the texture image projected onto the polygon can be deformed evenly or unevenly by correction using the correction information and then displayed by the display 231. The image projection light of the texture image deformed based on the correction information allows the subject 131 to see a virtual image 141 with reduced distortion, as in the third embodiments. The processing to change the mapping information can be executed at high speed when, for example, the controller 261 includes dedicated hardware. The dedicated hardware may, for example, include a graphics accelerator. This configuration allows high-speed correction of the image that the display 231 is caused to display. Therefore, when the position of both eyes of the subject 131 changes, for example, the distortion of the virtual image 141 due to the change in the position of both eyes can be reduced at high speed. This further improves the convenience of a technique for making the virtual image 141 visible to the subject 131.

In the above-described configuration using a polygon, the correction information may include information for changing the shape of the polygon to reduce distortion of the shape of the virtual image 141. For example, the texture image projected onto the polygon can be deformed evenly or unevenly by correction using the correction information and then displayed by the display 231. The image projection light of the texture image deformed based on the correction information allows the subject 131 to see a virtual image 141 with reduced distortion, as in the third embodiments. The processing to change the shape of the polygon can be executed at high speed when, for example, the controller 261 includes dedicated hardware. The dedicated hardware may, for example, include a graphics accelerator. This configuration allows high-speed correction of the image that the display 231 is caused to display. Therefore, when the position of both eyes of the subject 131 changes, for example, the distortion of the virtual image 141 due to the change in the position of both eyes can be reduced at high speed. This further improves the convenience of a technique for making the virtual image 141 visible to the subject 131.

In the configuration described in the third embodiments, one image is displayed by the display 231. The number of images displayed by the display 231, however, may be determined freely. The positions, shapes, and sizes of the images displayed by the display 231 may be determined freely. For each image that the controller 261 in this configuration causes the display 231 to display, the controller 261 may dynamically correct the image in accordance with the position of both eyes of the subject 131. Each image that the display 231 is caused to display may be corrected in the same way as in the third embodiments. For example, for each image that the display 231 is caused to display, the memory 251 stores a plurality of pieces of correction information corresponding to a plurality of reference positions in actual space. The controller 261 may determine the weighting factor α and the third correction information using the above-described first algorithm or second algorithm, for example, for each image that the display 231 is caused to display. For each image that the display 231 is caused to display, the controller 261 corrects the image using the third correction information corresponding to the image. This configuration allows the subject 131 to see a plurality of virtual images 141 respectively corresponding to the plurality of images. This further improves the convenience of a technique for making the virtual image 141 visible to the subject 131.

The invention claimed is:

1. An image projection apparatus comprising:
a display configured to display an image;
a first optical member;
at least one second optical member configured to project the image onto the first optical member and make a virtual image of the image visible to a subject;
a controller configured to dynamically correct the image in accordance with a position of both eyes of the subject; and
a memory configured to store a plurality of pieces of correction information corresponding to a plurality of reference positions in actual space,
wherein the controller is configured to:
select first correction information, corresponding to a position of a right eye of the subject, from among the plurality of pieces of correction information stored in the memory or generate the first correction information based on two or more of the plurality of pieces of correction information;
select second correction information, corresponding to a position of a left eye of the subject, from among the plurality of pieces of correction information stored in the memory or generate the second correction information based on two or more of the plurality of pieces of correction information;
generate third correction information based on the first correction information and the second correction information; and
use the third correction information to correct the image to be displayed by the display.

2. The image projection apparatus of claim 1, further comprising
a communication interface configured to acquire a captured image of the subject,
wherein the controller is configured to detect the position of both eyes of the subject based on the captured image.

3. The image projection apparatus of claim 1,
wherein the memory is configured to store a weighting factor based on a determination of a dominant eye of the subject, and
wherein the controller is configured to generate the third correction information based on the first correction information, the second correction information, and the weighting factor.

4. The image projection apparatus of claim 1, wherein
the first correction information is information for correcting a right eye image for the right eye,
the second correction information is information for correcting a left eye image for the left eye, and
the image includes the right eye image and the left eye image.

5. An image projection apparatus comprising:
a display configured to display a plurality of images;
a first optical member;
at least one second optical member configured to project the plurality of images onto the first optical member and make virtual images of the plurality of images visible to a subject;
a controller configured to dynamically correct, in accordance with a position of both eyes of the subject, each image among the plurality of images to be displayed by the display; and
a memory configured to store a plurality of pieces of correction information, corresponding to a plurality of reference positions in actual space, for each image to be displayed by the display,
wherein the controller is configured to:
select first correction information, corresponding to a position of a right eye of the subject, from among the plurality of pieces of correction information stored in the memory, or generate the first correction information based on two or more of the plurality of pieces of correction information, for each image to be displayed by the display;
select second correction information, corresponding to a position of a left eye of the subject, from among the plurality of pieces of correction information stored in the memory, or generate the second correction information based on two or more of the plurality of pieces of correction information, for each image to be displayed by the display;
generate third correction information, based on the first correction information and the second correction information, for each image to be displayed by the display; and correct each image, among the plurality of images to be displayed by the display, using the third correction information corresponding to the image.

6. The image projection apparatus of claim 5, further comprising
a communication interface configured to acquire a captured image of the subject,
wherein the controller is configured to detect the position of both eyes of the subject based on the captured image.

7. The image projection apparatus of claim 5,
wherein the memory is configured to store a weighting factor determined taking into consideration a dominant eye of the subject, and
wherein the controller is configured to generate the third correction information based on the first correction information, the second correction information, and the weighting factor.

8. The image projection apparatus of claim 5, wherein
the first correction information is information for correcting a right eye image for the right eye,
the second correction information is information for correcting a left eye image for the left eye, and
the image includes the right eye image and the left eye image.

9. An image projection apparatus comprising:
a display configured to display an image of a polygon as viewed from a virtual camera, the polygon having a texture projected thereon;
a first optical member;
at least one second optical member configured to project the image onto the first optical member and make a virtual image of the image visible to a subject;
a controller configured to dynamically correct the polygon in accordance with a position of both eyes of the subject; and
a memory configured to store a plurality of pieces of correction information corresponding to a plurality of reference positions in actual space,
wherein the controller is configured to:
select first correction information, corresponding to a position of a right eye of the subject, from among the plurality of pieces of correction information stored in the memory or generate the first correction information based on two or more of the plurality of pieces of correction information;
select second correction information, corresponding to a position of a left eye of the subject, from among the plurality of pieces of correction information stored in the memory or generate the second correction information based on two or more of the plurality of pieces of correction information;
generate third correction information based on the first correction information and the second correction information; and
correct the polygon using the third correction information.

10. The image projection apparatus of claim 9, wherein the controller is configured to correct the polygon by changing mapping information indicating a correspondence relationship between texture coordinates on the texture and a plurality of vertices of the polygon.

11. The image projection apparatus of claim 9, wherein the controller is configured to correct the polygon by changing a shape of the polygon.

12. The image projection apparatus of claim 9, further comprising
a communication interface configured to acquire a captured image of the subject,
wherein the controller is configured to detect the position of both eyes of the subject based on the captured image.

13. The image projection apparatus of claim 9,
wherein the memory is configured to store a weighting factor based on a determination of a dominant eye of the subject, and
wherein the controller is configured to generate the third correction information based on the first correction information, the second correction information, and the weighting factor.

14. The image projection apparatus of claim 9, wherein
the first correction information is information for correcting a right eye image for the right eye,
the second correction information is information for correcting a left eye image for the left eye, and
the image includes the right eye image and the left eye image.

* * * * *